(12) United States Patent
Kreuser et al.

(10) Patent No.: US 6,412,722 B1
(45) Date of Patent: Jul. 2, 2002

(54) BAIT CAST CONTROL FISHING REEL

(75) Inventors: Christopher F. Kreuser; Stephen J. Jacobs, both of Racine; Todd A. Rathe, Mequon, all of WI (US); John W. Chapman, Spirit Lake, IA (US)

(73) Assignee: Pure Fishing, Inc., Spirit Lake, IA (US)

( * ) Notice: Subject to any disclaimer, the term of this patent is extended or adjusted under 35 U.S.C. 154(b) by 0 days.

(21) Appl. No.: 09/450,968

(22) Filed: Nov. 30, 1999

Related U.S. Application Data

(63) Continuation-in-part of application No. 09/076,970, filed on May 13, 1998.

(51) Int. Cl.[7] ............................................. A01K 89/01
(52) U.S. Cl. ...................................................... 242/288
(58) Field of Search ................................ 242/223, 286, 242/288, 295, 303, 323

(56) References Cited

U.S. PATENT DOCUMENTS

| | | | |
|---|---|---|---|
| 329,711 A | 11/1885 | Briggs | |
| 496,654 A | 5/1893 | Heskett | |
| 506,094 A | 10/1893 | Boardman | |
| 937,672 A | 10/1909 | Bronson | |
| 983,013 A | 1/1911 | Wright | |
| 1,089,616 A | 3/1914 | Yingling | |
| 1,305,910 A | 6/1919 | Liddell | |
| 1,357,670 A | 11/1920 | Adams | |
| 1,395,118 A | 10/1921 | Jones | |
| 1,420,804 A | 6/1922 | Adams | |

(List continued on next page.)

FOREIGN PATENT DOCUMENTS

| | | |
|---|---|---|
| DE | 3300810 | 7/1983 |
| JP | 58100570 | 7/1983 |
| JP | 58115964 | 8/1983 |

(List continued on next page.)

*Primary Examiner*—Emmanuel M. Marcelo
(74) *Attorney, Agent, or Firm*—Roylance, Abrams, Berdo & Goodman, L.L.P.

(57) ABSTRACT

A bait cast fishing reel includes a frame, a spool rotatably coupled to the frame, at least one magnet having a magnetic field coupled to a first one of the frame and spool, at least one electroconductive coil coupled to a second one of the frame and the spool within the magnetic field, an electrical energy storage device electrically coupled to the at least one electroconductive member to store electrical energy generated during rotation of the at least one magnet and the at least one electroconductive member relative to one another during rotation of the spool, a sensor configured to generate spool rotation signals representing rotation of the spool over time, a controller coupled to the sensor and configured to generate a control signal based upon the spool rotation signal, and a braking mechanism coupled to the controller and to the electrical energy storage device. The braking mechanism utilizes electrical energy from the electrical energy storage device to control braking of the spool in response to the control signal from the controller. In one exemplary embodiment, the braking mechanism utilizes electrical energy from the electrical energy storage device to create a magnetic field opposing rotation of the spool. In another exemplary embodiment, the braking mechanism comprises a first surface coupled to the spool, a second surface coupled to the frame and an actuator configured to move the first and second surfaces into frictional engagement with one another. In yet another exemplary embodiment, the controller includes a memory storage device configured to store a spool rotation signal during a first cast, wherein the controller conducts a comparison of the spool rotation signals generated during a second cast with the stored spool rotation signals from the first cast and generates the braking signal based upon the comparison.

12 Claims, 10 Drawing Sheets

U.S. PATENT DOCUMENTS

| | | |
|---|---|---|
| 1,426,594 A | 8/1922 | Oltsch |
| 1,444,560 A | 2/1923 | Schmid |
| 1,456,283 A | 5/1923 | Schmid |
| 1,509,324 A | 9/1924 | Tobey |
| 1,554,133 A | 9/1925 | Schmid |
| 1,568,149 A | 1/1926 | Foss |
| 1,569,210 A | 1/1926 | Snyder |
| 1,580,524 A | 4/1926 | Nelson et al. |
| 1,811,266 A | 6/1931 | Foss |
| 1,821,461 A | 9/1931 | Chudley |
| 1,892,541 A | 12/1932 | Smelser |
| 1,919,104 A | 7/1933 | Guest |
| 2,012,251 A | 8/1935 | Smith |
| 2,055,358 A | 9/1936 | Maynes |
| 2,166,662 A | 7/1939 | Jacobson |
| 2,261,610 A | 11/1941 | Yarosz |
| 2,262,462 A | 11/1941 | Margis, Jr. |
| 2,309,146 A | 1/1943 | Whistler |
| 2,312,576 A | 3/1943 | Nelson |
| 2,324,324 A | 7/1943 | Rutledge |
| 2,361,239 A | 10/1944 | Ransom |
| 2,380,670 A | 7/1945 | Nelson |
| 2,482,428 A | 9/1949 | Miller |
| 2,482,863 A | 9/1949 | Nelson |
| 2,483,331 A | 9/1949 | Bollman |
| 2,500,026 A | 3/1950 | Erickson |
| 2,508,217 A | 5/1950 | Brell |
| 2,516,517 A | 7/1950 | Hutchison |
| 2,520,552 A | 8/1950 | Kilian |
| 2,547,282 A | 4/1951 | Plouff |
| 2,555,604 A | 6/1951 | Pies |
| 2,593,045 A | 4/1952 | Maroshick |
| 2,600,685 A | 6/1952 | Perinoni et al. |
| 2,607,547 A | 8/1952 | Pasanen |
| 2,607,548 A | 8/1952 | Hollander |
| 2,613,047 A | 10/1952 | Kelso |
| 2,613,883 A | 10/1952 | Limpright |
| 2,623,705 A | 12/1952 | Whittington |
| 2,628,041 A | 2/1953 | Slater |
| 2,658,696 A | 11/1953 | Cooper |
| 2,672,302 A | 3/1954 | Magee |
| 2,752,686 A | 7/1956 | Anderson et al. |
| 2,783,953 A | 3/1957 | Hoot |
| 2,853,252 A | 9/1958 | Thiel |
| 2,953,314 A | 9/1960 | Voll |
| 3,510,084 A | 5/1970 | Andrew |
| 3,721,399 A | 3/1973 | Mroz |
| 4,013,241 A | 3/1977 | Gray |
| 4,117,990 A | 10/1978 | Denny |
| 4,402,470 A | 9/1983 | Hamayasu |
| 4,549,703 A | 10/1985 | Atobe |
| 4,601,438 A | 7/1986 | Young |
| 4,601,439 A | 7/1986 | Moosberg |
| 4,620,371 A | 11/1986 | Murakami et al. |
| 4,650,161 A | 3/1987 | Kaneko |
| 4,697,758 A | 10/1987 | Hirose et al. |
| 4,714,208 A | 12/1987 | Holahan et al. |
| 4,779,814 A | 10/1988 | Uetsuki et al. |
| 4,790,492 A | 12/1988 | Atobe |
| 4,807,828 A | 2/1989 | Yamaguchi |
| 4,821,975 A | 4/1989 | Uetsuki et al. |
| 4,874,140 A | 10/1989 | Hitomi |
| 4,917,321 A | 4/1990 | Roberts |
| 4,934,628 A | 6/1990 | Yamaguchi |
| 4,940,194 A | 7/1990 | Young |
| 5,236,147 A | 8/1993 | Kaneko |
| 5,248,113 A | 9/1993 | Daniels |
| 5,273,235 A | 12/1993 | Sato |
| 5,345,691 A | 9/1994 | Falk et al. |
| 5,395,065 A | 3/1995 | Hirose |
| 5,427,323 A | 6/1995 | Kaneko et al. |
| 5,503,341 A | 4/1996 | Kaneko et al. |
| 5,524,831 A | 6/1996 | Carlson |
| 5,577,679 A | 11/1996 | Thomas |
| 5,833,154 A | 11/1998 | Kaneko |
| 5,833,156 A | 11/1998 | Park et al. |

FOREIGN PATENT DOCUMENTS

| | | |
|---|---|---|
| JP | 58115965 | 8/1983 |
| JP | 59178070 | 11/1984 |
| JP | 157587 | 1/1987 |
| JP | 4-84842 | 3/1992 |
| JP | 4-91734 | 3/1992 |
| JP | 4-91735 | 3/1992 |
| JP | 4-104750 | 4/1992 |
| JP | 4-258239 | 9/1992 |
| JP | 5-23084 | 2/1993 |
| JP | 5-30882 | 2/1993 |
| JP | 5-103567 | 4/1993 |
| JP | 5-316906 | 12/1993 |
| JP | 6-46721 | 2/1994 |
| JP | 6-98663 | 4/1994 |
| JP | 6-113703 | 4/1994 |
| JP | 6-125684 | 5/1994 |
| JP | 6-133674 | 5/1994 |
| JP | 6-133675 | 5/1994 |
| JP | 6-141741 | 5/1994 |
| JP | 6-141742 | 5/1994 |
| JP | 6-141743 | 5/1994 |
| JP | 6-205629 | 7/1994 |
| JP | 10-155398 | 6/1998 |

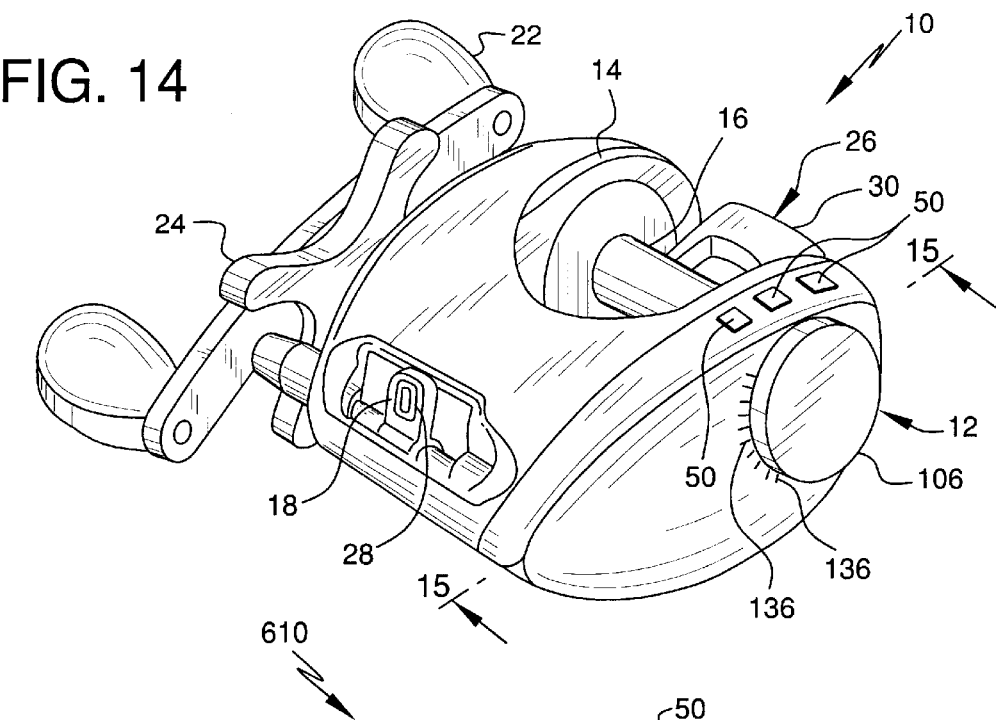
FIG. 14
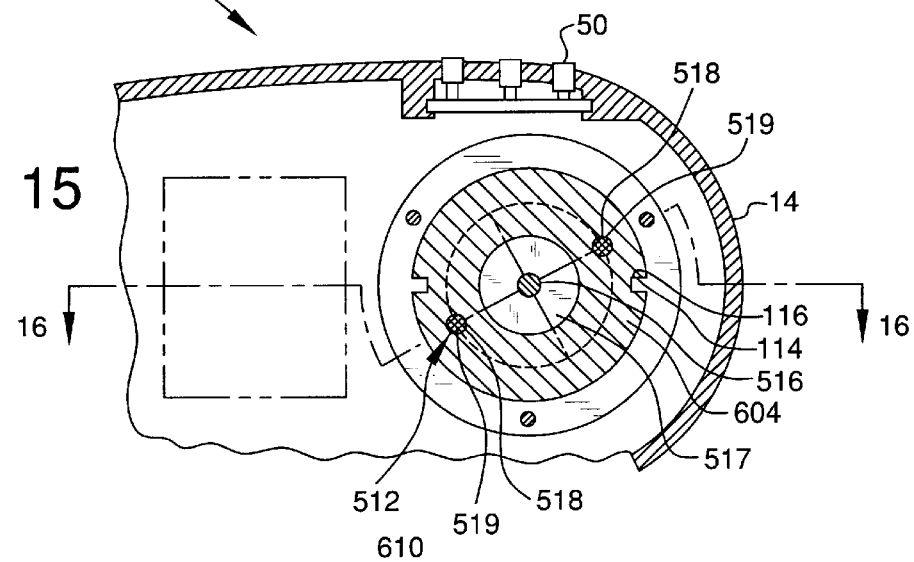
FIG. 15
FIG. 16

BAIT CAST CONTROL FISHING REEL

CROSS-REFERENCE TO RELATED APPLICATIONS

The present application is a continuation-in-part of co-pending U.S. patent application Ser. No. 09/076,970 entitled Bait Cast Control Fishing Reel filed on May 13, 1998 by Christopher F. Kreuser, Stephen J. Jacobs, and John W. Chapman (the full disclosure of which is hereby incorporated by reference), from which priority is claimed under 35 U.S.C. §120.

FIELD OF THE INVENTION

The present invention relates to fishing reels. In particular, the present invention relates to devices and systems for preventing backlash during a cast of a bait or lure from a spool of a fishing reel.

BACKGROUND OF THE INVENTION

During casting of a bait or lure connected to a fishing line, the velocity of the bait or lure and the interconnected fishing line accelerates to maximum and then decelerates until the bait or lure hits the water. During the cast, the spool carrying the fishing line is allowed to rotate to release the fishing line. Backlash occurs when the spool rotates and releases fishing line at a rate faster than the velocity of the bait or lure and line. Backlash often occurs during deceleration of the bait or lure and line or after the bait or lure and line hits the water. As a result, the excess line released from the spool accumulates and tangles around the spool, within the reel and about the opening of the reel.

Various devices to prevent backlash have been developed. These devices typically include a braking mechanism that applies a braking force to the spool to slow rotation of the spool and the release of fishing line from the spool. Conventional braking mechanisms typically rely on friction or magnetic fields to brake the spool. Braking mechanisms employing friction typically move friction brakes coupled to the rotating spool and the reel frame surrounding the spool into physical contact with one another to slow rotation of the spool.

Braking mechanisms employing magnetic fields typically move magnetic brakes coupled to the rotating spool and the reel frame surrounding the spool to create eddy currents that slow rotation of the spool. Conventional braking mechanisms move the friction brakes or magnetic brakes using either centrifugal force or electrically powered motors. Fishing reels utilizing centrifugal force typically slidably support the friction brake or the magnetic brake on the spool opposite an opposing friction brake or magnetic brake on the reel frame. Centrifugal force exerted upon the brake slides the brake towards the opposing brake to reduce speed spool rotation. Alternatively, other conventional fishing reels utilize electric motors which move friction brake members into engagement with one another or move magnetic brakes relative to one another to actuate braking of the spool rotation.

Both types of braking mechanisms have several drawbacks. Braking mechanisms employing electric motors to move friction brakes or magnetic brakes are more complex, costly, difficult to manufacture and less durable. Braking mechanisms employing centrifugal force inherently apply a maximum braking force to the spool when the spool rotates with a maximum velocity. As a result, braking mechanisms relying on centrifugal force for actuation reduce casting distance.

Conventional backlash preventing devices utilize various different criteria for determining when to apply a braking force to the spool. As discussed above, braking mechanisms utilizing centrifugal force to actuate either the friction or magnetic brakes inherently apply the maximum braking force to the spool when the spool is rotating with a maximum velocity. This reduces casting distance.

Alternatively, other backlash preventing devices actuate the braking mechanism utilizing preset values. For example, in one such backlash preventing device, rotation of the spool is automatically braked when a predetermined time has elapsed from the start of the rotation of the spool. With another such backlash preventing device, braking of the spool occurs when the rotational velocity of the spool exceeds the preset value of a predetermined amount. Because such backlash preventing devices actuate braking of the spool based on preset values, such backlash preventing devices do not adapt to different casting conditions, including different environmental conditions such as wind, different equipment such as different lines, lures and equipment and different users of the reel.

Another type of backlash preventing device actuates the braking mechanism based upon a comparison between the amount of line passing a particular point on the rod and the amount of line being released from the reel. Yet another type of backlash preventing device actuates the braking mechanism based upon the slope of the fishing line between the reel and the shaft. Although such backlash preventing devices are somewhat more adaptable to varying casting conditions, such backlash preventing devices are complex and relatively expensive.

In addition to avoiding backlash during a cast, the user will many times try to cast the lure or bait to the identical location of a previous cast, such as when the user has found a good fishing spot. Unfortunately, good fishing spots are typically located in spots difficult to access, such as adjacent to logs, rocks or other obstructions. Casting the lure or bait to the identical location of a previous cast is extremely difficult due to varying casting forces applied by the user as well as varying environmental casting conditions such as wind. As a result, the subsequent cast will frequently overshoot or undershoot the target.

As a result, there is a continuing need for the braking mechanism for a backlash preventing device which requires few, if any, moving parts, which is simple and easy to manufacture and which is controllable. There is also a continuing need for a backlash preventing device which automatically adapts to varying casting conditions and which is simple and easy to manufacture and use. There is also a continuing need for a device that enables the user to cast a lure or bait a distance substantially identical to the distance achieved by a previous cast.

SUMMARY OF THE INVENTION

The present invention provides a fishing reel including a frame, a spool rotatably coupled to the frame, at least one magnet having a magnetic field coupled to a first one of the frame and the spool, at least one electroconductive coil coupled to a second one of the frame and the spool within the magnetic field, an electrical energy storage device electrically coupled to the at least one electroconductive member to store electrical energy generated during rotation of the at least one magnet and the at least one electroconductive member relative to one another during rotation of the spool, a sensor configured to generate spool rotation signals representing rotation of the spool over time, a controller coupled to the sensor and configured to generate a control signal based upon the spool rotation signals and a braking mechanism coupled to the controller and to the electrical energy storage device. The braking mechanism utilizes electrical energy from the electrical energy storage device to control braking of the spool in response to the control signal from the controller.

The present invention also provides a method for preventing backlash during a cast of baits and lures from a spool of a baitcast fishing reel. The method includes converting kinetic energy of the spool during rotation into electrical energy, storing the electrical energy and controlling braking of the spool using the stored electrical energy.

The present invention also provides a fishing reel including a frame, a spool rotatably coupled to the frame and configured to rotate in a first direction during casting, and a braking mechanism. The braking mechanism includes at least one magnet having a magnetic field and coupled to a first one of the frame and spool, at least one electroconductive coil coupled to a second one of the frame and spool within the magnetic field, an electrical energy storage device and a controller electrically coupled to the electrical energy storage device and the plurality of electroconductive coils. The controller is configured to sequentially direct electrical current from the electrical energy storage device across each of the plurality of electroconductive coils in a direction such that the braking mechanism applies a force to the spool in a second opposite direction.

The present invention is also directed to a method for controlling a fishing reel during a first cast and during a second cast. The method includes generating first cast spool rotation signals representing rotation of the spool over time during the first cast, storing the first cast spool rotation signal and braking the spool based upon the storage first cast spool rotation signals during the second cast.

BRIEF DESCRIPTION OF THE DRAWINGS

FIG. 14 is a perspective view of an exemplary fishing reel including the backlash prevention system of FIG. 11.

FIG. 15 is a sectional view of the fishing reel of FIG. 14 taken lines 15—15.

FIG. 16 is a sectional view of the fishing reel of FIG. 15 taken lines 16—16.

DETAILED DESCRIPTION OF THE PREFERRED EMBODIMENTS

I. Backlash Prevention System 12

Figure 1:
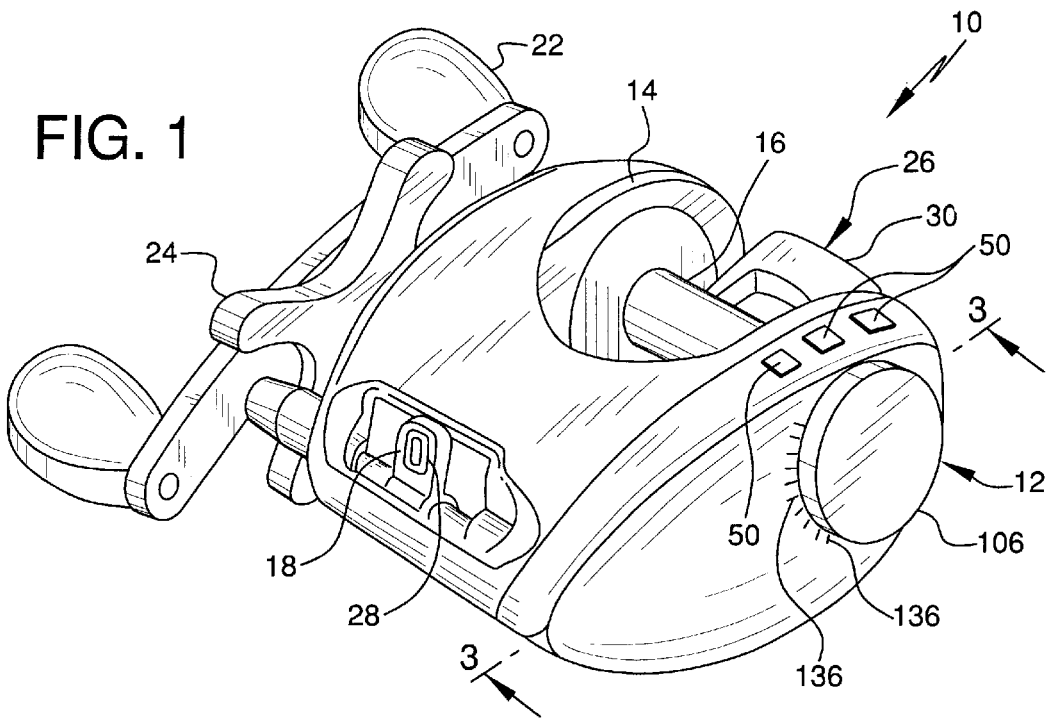
FIG. 1 is a perspective view of an exemplary fishing reel including a backlash prevention system of the present invention.

FIG. 1 is a perspective view of an exemplary fishing reel 10 including backlash prevention system 12. Fishing reel 10 comprises a bait cast reel and generally includes housing or frame 14, spool 16, spool drive means (not shown), drag means (not shown), line guide 18, crank handle 22, drag control 24 and clutch 26. Frame 14 supports each of the remaining components of reel 10, including backlash prevention system 12. Frame 14 additionally houses and encloses the spool driving means, the drag means and backlash prevention system 12. As can be appreciated, frame 14 may be made of various materials and may have a multitude of different sizes and shapes.

Spool 16 is conventionally known and is rotatably coupled to frame 14. Spool 16 is rotatably supported between opposing sides of frame 14 so as to rotate about an axis extending between opposing sides of frame 14. Spool 16 is also operably coupled to the spool driving means and the drag means. Spool 16 is configured for carrying fishing line which is wrapped thereabout and which is threaded through line guide 18.

Line guide 18 extends at a forward end of reel 10. Line guide 18 includes an opening 28 through which the fishing line is threaded. In the embodiment illustrated, line guide 18 reciprocates from side to side of frame 14 during the rotation of spool 16 and during the retrieval of fishing line to evenly distribute the fishing line across the width of spool 16.

The spool drive means (not shown) is conventionally known and is operably coupled between spool 16, line guide 18 and crank handle 22. The spool drive means typically comprises at least one gear train. Upon being driven by handle 22, the spool drive means rotates spool 16 and reciprocates line guide 18 in a conventionally known manner to retrieve the fishing line.

The drag means (not shown) is conventionally known and is operably coupled to spool 16. The drag means retards the rotation of spool 16 and the corresponding release of fishing line from spool 16 in a conventionally known manner when clutch 26 is engaged. The extent to which the drag means retards the rotation of spool 16 is adjusted by drag control 24.

Clutch 26 is conventionally known and is operably coupled between the spool 16 and both the spool drive means and the drag means. Clutch 26 includes clutch lever 30 which engages and disengages clutch 26. When clutch 26 is engaged, the spool drive means and the drag means are operably coupled to spool 16. As a result, rotation of handle 22 rotates spool 16 to retrieve fishing line. At the same time, the drag mechanism retards reverse rotation of spool 16 to release the fishing line. Depressment of clutch lever 30 disengages clutch 26 to uncouple spool 16 from the spool driving means and the drag means. As a result, spool 16 is substantially free to rotate in the reverse direction to release fishing line such as during casting. During casting, unless appropriately braked, spool 16 frequently rotates at a speed faster than the velocity of the bait or lure and line being cast. This results in backlash.

Upon being actuated, backlash prevention system 12 applies a braking force to spool 16 to slow the rotation of spool 16 and to prevent backlash. Backlash prevention system 12 is preferably actuated upon depression of clutch lever 30 and disengagement of clutch 26 by a conventionally known electrical or mechanical switch (not shown) coupled to clutch lever 30. Backlash prevention system 12 is unactuated upon the reengagement of clutch 26. Alternatively, backlash prevention system 12 may be actuated or unactuated with other control buttons, levers and the like. Backlash prevention system 12 is configured to prevent backlash, to automatically adapt to varying casting conditions and to maximize casting distance.

Figure 2:
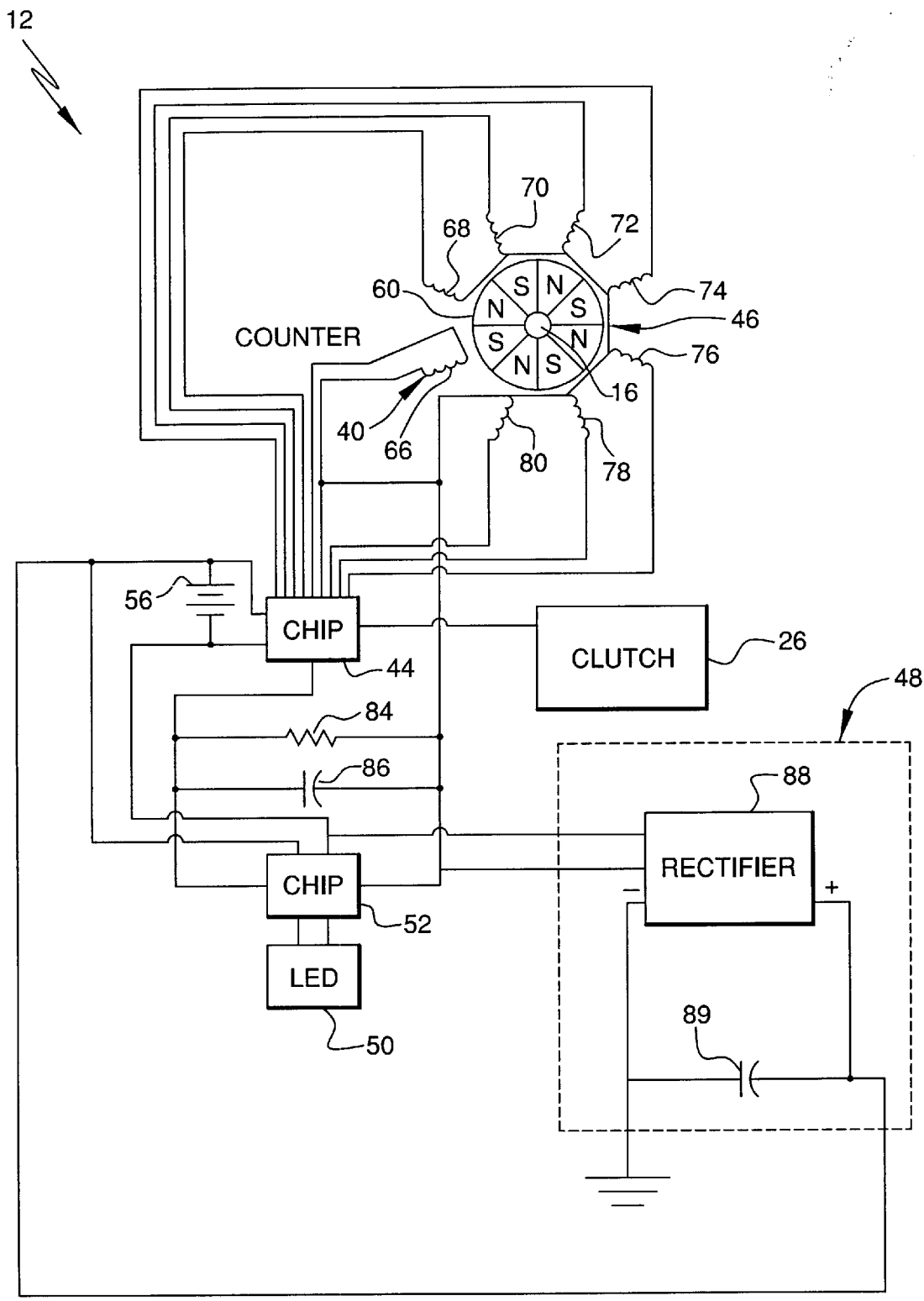
FIG. 2 is a schematic view illustrating the backlash prevention system of FIG. 1.

FIG. 2 is a schematic view illustrating backlash prevention system 12. As best shown by FIG. 2, backlash prevention system 12 generally includes sensor 40, microprocessor 44, braking mechanism 46, energy storage and supply circuit 48, electronic component 50, digital controller 52 and battery 56. Sensor 40 is located and configured to sense rotation of spool 16 and to generate signals representing rotation of spool 16 over time. In the exemplary embodiment illustrated, sensor 40 preferably comprises at least one multiple pole magnet 60 coupled to spool 16 for rotation with spool 16 and an electroconductive member 66 supported within the magnetic field of the magnet 60. Electroconductive member 66 preferably comprises a coil on winding of nonmagnetic electroconductive material. Rotation of spool 16 causes the magnetic field provided by magnet 60 to periodically vary. This change in magnetic field induces sinusoidal pulses of electric current within member 66 representative of the rotation of spool 16.

Alternatively, sensor 40 may comprise other well-known sensing devices. For example, sensor 40 may alternatively comprise an appropriately situated light source, such as a light emitting diode and a photoconductive sensor, wherein rotation of spool 16 causes the light received by the photoconductive member to vary. In addition, sensor 40 may also alternatively comprise magnet 60 used in conjunction with a magnetoresistive element that has an electrical resistance which varies in response to changes in magnetic field such that signals representing rotation of spool 16 over time are generated by directing current across the magnetoresistive element and sensing the change in voltage across the magnetoresistive element. These are but a few examples of alternative sensing devices which may be employed to generate spool rotation signals representing rotation of the spool over time.

Microprocessor 44 preferably comprises a conventionally known processor chip, such as Intel 80C196, supported within reel 10 and operably connected to sensor 40 and braking mechanism 46. Microprocessor 44 actuates braking mechanism 46 based upon signals from sensor 40. Microprocessor 44 acts as a counter, a timer, a comparator and a switch. As will be appreciated, each of these functions provided by microprocessor 44 may alternatively be provided by multiple microprocessor chips as well as other well known components which provide the same individual functions alone or in combination. Serving as a counter and a timer, microprocessor 44 includes an electrical resistor preferably having a large resistance of approximately one megohm across opposite leads of member 66 whereby microprocessor 44 counts the pulses of electrical current across the resistor. To facilitate counting, microprocessor 44 also preferably includes a conventionally known signal conditioning component which converts the sinusoidal pulses into square wave forms (e.g., an analog-to-digital converter). Microprocessor 44 counts a number of pulses received from sensor 40 across the resistor during a predetermined time interval to determine the rotational velocity of spool 16 during the particular time interval. Alternatively, microprocessor 44 may determine the rotational velocity of spool 16 during a particular time interval by sensing the voltage induced across its resistor which corresponds to the rotational velocity of spool 16. Serving as a memory device, microprocessor 44 stores or records the rotational velocity of spool 16 for each time interval. Serving as a comparator, microprocessor 44 compares the rotational velocity of spool 16 during each consecutive time interval to identify a maximum rotational velocity of spool 16 during a cast and to identify a peak time at which spool 16 rotates with the maximum rotational velocity. Serving as a switch, microprocessor 46 then actuates braking mechanism 46 based upon the identified peak time at a point in time following the identified peak time. Microprocessor 44 also actuates braking mechanism 46 based on the identified maximum rotational velocity of spool 16. In the preferred embodiment, microprocessor 44 includes at least one conventionally known solid state electrical switch, such as a transistor element, to actuate braking mechanism 46. Alternatively, backlash prevention system 12 may additionally include mechanical switches which are electrically actuated by microprocessor 44 to in turn actuate braking mechanism 46. Because microprocessor 44 identifies the maximum rotational velocity of spool 16 for each individual cast and then utilizes the identified maximum rotational velocity and peak time as a basis for determining when to actuate braking mechanism 46, microprocessor 44 consistently and accurately actuates braking mechanism 46 according to the preestablished criteria independent of varying casting conditions.

In addition to actuating braking mechanism 46, microprocessor 44 also controls the amount of braking force applied by braking mechanism 46 to spool 16 based upon the maximum rotational velocity of spool 16 during the cast. In particular, microprocessor 44 controllably increases and decreases the amount of braking force generated by braking mechanism 46. As a result, the timing as well as the degree of braking applied to spool 16 by braking mechanism 46 is precisely controlled to maximize casting distance while minimizing the potential for backlash.

Braking mechanism 46 applies a braking force to spool 16 to slow rotation of spool 16 in response to braking signals from microprocessor 44. In the embodiment illustrated, braking mechanism 46 includes magnet 60, electroconductive members 66, 68, 70, 72, 74, 76, 78, 80, electrical resistor 84 and capacitor 86. As discussed above, magnet 60 preferably comprises a permanent multi-pole magnet coupled to spool 16 for rotation with spool 16. Magnet 60 provides a magnetic field which is utilized as part of braking mechanism 46 and sensor 40. Alternatively, separate and distinct magnets may be individually provided for sensor 40 and braking mechanism 46.

Electroconductive members 66–80 are made from an electroconductive material and are supported adjacent to spool 16 within the magnetic field of magnet 60. Electroconductive members 66–80 are preferably nonmagnetic to prevent uncontrollable and constant braking of spool 16 by resulting eddy currents. Although electroconductive members 66–80 are illustrated as encircling magnet 60, braking mechanism 416 may alternatively be configured such that magnet 60 encircles electroconductive members 66–80. Electroconductive members 68–80 each have a first portion electrically coupled to a first terminal of resistor 84 and a second portion electrically connectable to a second terminal of resistor 84 through microprocessor 44.

Resistor 84 comprises a conventionally known electrical resistor electrically coupled between the first portion of electroconductive members 66–80 and microprocessor 44. Resistor 84 has an electrical resistance such that relative movement of magnet 60 and members 66–80 is retarded or opposed by a non-deminimus force when microprocessor 44 electrically couples members 66–80, individually, to a second terminal side of resistor 84. Resistor 84 creates a sufficient load across members 66–80 such that members 66–80 impede rotation of magnet 60 and spool 16. Resistor 84 preferably has an electrical resistance of less than or equal to about 100 ohms. As will be understood by those in the art, the maximum resistance that resistor 84 may have to enable braking mechanism 46 to effectively retard or oppose the rotation of spool 16 will increase as the number of electroconductive members positioned within the magnetic field of magnet 60 and electrically coupled across resistor 84 are increased. In the preferred embodiments illustrated, the maximum resistance of resistor 84 is much less than the relatively large resistance (usually a megaohm) provided by the counter of microprocessor 44 to measure or count the frequency, voltage or current in member 66 to sense the rotational velocity of spool 16.

Because braking mechanism 46 includes a plurality of electroconductive members 66–80, the braking force generated by braking mechanism 46 and applied against the rotation of spool 16 may be increased from a nonzero value or decreased to a nonzero value to optimize the amount of braking force applied to spool 16. Moreover, increasing and decreasing the braking force generated by braking mechanism 46 is simply achieved by selectively coupling and de-coupling members 66–80 across resistor 84. Thus, braking mechanism 46 enables the braking force applied to spool 16 to be actuated and to be adjusted without requiring a motor or other moving components which are generally less durable, consume more space and are more difficult to manufacture.

Although braking mechanism 46 is illustrated as including a plurality of electroconductive members 68–80 that are selectively and individually electrically coupled across resistor 84 by microprocessor 44 to selectively increase and decrease the braking force applied to spool 16 by braking mechanism 46, various other means for increasing or decreasing the braking force applied by braking mechanism 46 may be employed. For example, in lieu of individually coupling and de-coupling members 68–80 across resistor 84 to increase and decrease the braking force of braking mechanism 46, microprocessor 44 may alternatively decrease the electrical resistance of resistor 84 to increase the braking force created by members 68–80 of braking mechanism 46. For example, resistor 84 may alternatively comprise a variable resistance potentiometer or transistor coupled to microprocessor 44, wherein microprocessor 44 controls the resistance of the transistor. As yet another alternative, resistor 84 may alternatively comprise a plurality of distinct resistors wherein microprocessor 44 either couples members 68–80 across a resistor having a lesser resistance to increase braking force or having a greater resistance to reduce braking force, or electrically couples members 68–80 across a fewer number of resistors to increase the braking force or a greater number of resistors to reduce braking force.

Although resistor 84 is illustrated as a conventional electrical resistor, resistor 84 may alternatively comprise an electrical component or components that not only provide an electrical resistance but also utilize the energy. For example, resistor 84 may alternatively be part of an electrical component such as a light emitting diode whereupon the light emitting diode emits light upon rotation of spool 16 when braking mechanism 46 is actuated by microprocessor 44 to electrically couple at least one of members 66–80 across the electrical component.

Capacitor 86 provides a conventionally known capacitor electrically coupled in parallel with resistor 84. Capacitor 86 smoothes current peaks or fluctuations.

Although braking mechanism 46 is illustrated as utilizing at least one magnet having a magnetic field and coupled to a first one of the frame and the spool, at least one electroconductive member coupled to a second one of the frame in the spool within the magnetic field, and at least one electrical resistor coupled to said at least one electroconductive member, braking mechanism 46 may alternatively comprise any one of a variety of well-known alternative braking mechanism such as those relying upon selective engagement of friction surfaces to brake the rotation of spool 16 or those relying upon a movement of oppositely supported magnets relative to one another to brake the rotation of spool 16.

In addition to braking spool 16, braking mechanism 46 also converts the energy of rotating spool 16 into electrical energy which may be stored and used to power various electrical components. As a result, backlash prevention system 12 additionally includes energy storage and supply circuit 48. Energy storage to supply circuit 48 generally includes rectifier bridge 88 and capacitor 89. Rectifier bridge 88 converts the alternating current induced within members 68–80 into a direct current for charging capacitor 89.

In addition to braking spool 16, braking mechanism 46 also converts the energy of rotating spool 16 into electrical energy which may be stored and used to power various electrical components. As a result, backlash prevention system 12 additionally includes energy storage and supply circuit 48. Energy storage and supply circuit 48 generally includes rectifier bridge 88 and capacitor 89. Rectifier bridge 88 converts the alternating current induced within members 68–80 into a direct current for charging capacitor 89. Capacitor 89 stores the electrical energy and is electrically coupled to microprocessor 44, electrical component 50, controller 52 and battery 56. Digital controller 52 as well as microprocessor 44 are electrically powered by energy generated by braking mechanism 46. Controller 52 preferably comprises a processor chip, such as an Intel 80C196, and controls electrical component 50 while electrically coupling electrical component 50 to braking mechanism 46, capacitor 89 and battery 56.

Electrical component 50 preferably comprises a plurality of light emitting diodes (LEDs) which provide the person fishing with a visual display. In the embodiment illustrated, digital controller 52 may be selectively actuated by the person fishing, such as by movement of a control switch, to provide the person fishing with various types of information. In particular, controller 52 is configured to alternatively control electronic component 50 to visually indicate the braking force applied by braking mechanism 46 to spool 16 or the rotational velocity of spool 16 based upon signals received from microprocessor 44. This visual indication is achieved by digital controller 52 selectively and individually charging the light emitting diodes of electronic component 50.

Electronic component 50 may alternatively comprise other electronic components as well. For example, electronic component 50 may alternatively comprise a liquid crystal display (LCD) coupled to controller 52 and configured to digitally display information such as the braking force applied by braking mechanism 46, the rotational velocity of spool 16, time duration of the cast or the estimated distance of the cast as also calculated and provided by microprocessor 44. Electronic component 50 may also comprise a light source for illuminating reel 10 during night fishing. Because electronic component 50 as well as microprocessors 44 and 52 are at least partially powered by the energy created by braking mechanism 46, the required size of battery 56 is reduced and the life of battery 56 is increased.

Battery 56 is electrically coupled to microprocessor 44 and digital controller 52. Battery 56 powers controllers 44 and 50 during an initial cast or when energy stored within capacitor 86 is insufficient. Battery 56 is preferably a rechargeable battery that is electrically coupled to braking mechanism 46 such that battery 56 is recharged during the braking of spool 16 by braking mechanism 46.

Figure 3:
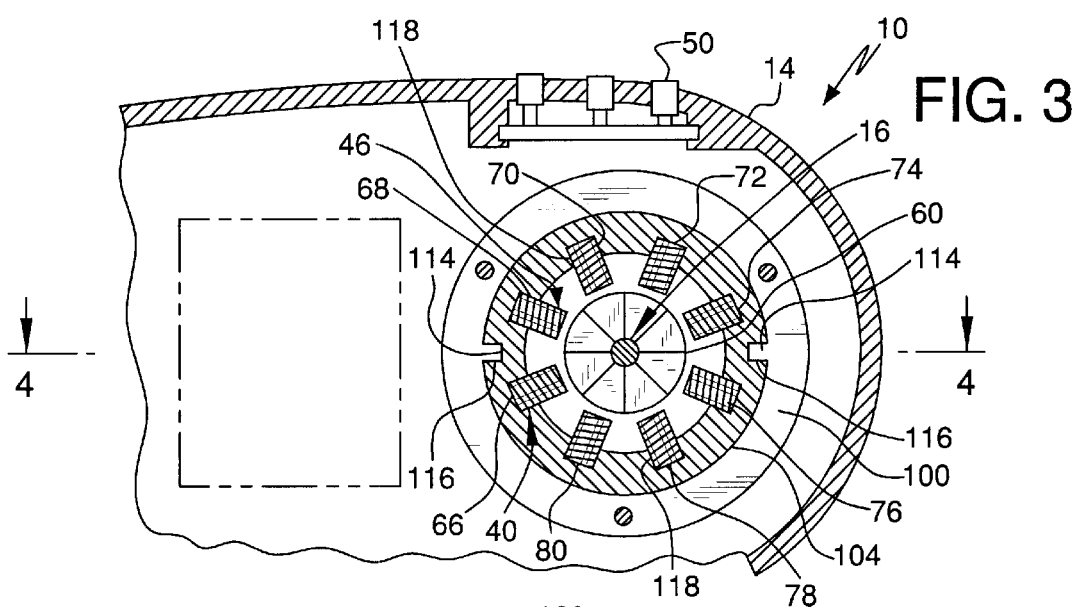
FIG. 3 is a sectional view of the reel of FIG. 1 taken along lines 3—3.
Figure 4:
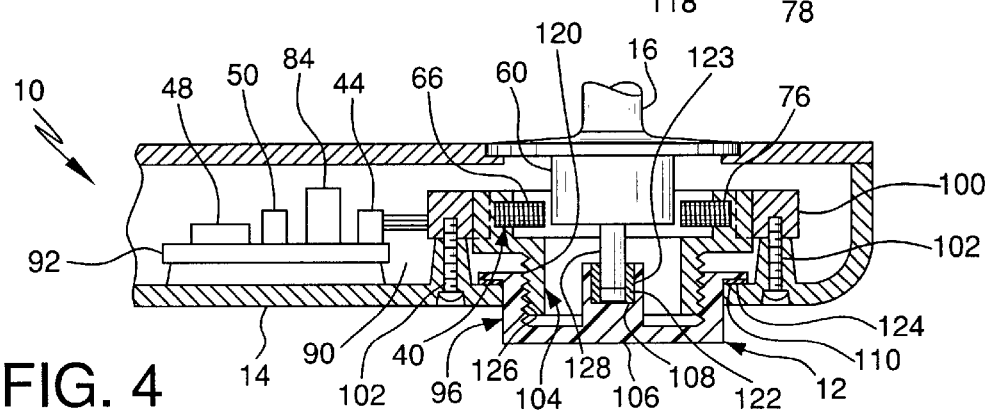
FIG. 4 is a sectional view of the reel of FIG. 3 taken along lines 4—4.

FIGS. 3 and 4 further illustrate backlash prevention system 12. FIG. 3 is a sectional view of reel 10 taken along lines 3—3. FIG. 4 is a sectional view of reel 10 taken along lines 4—4 of FIG. 3. As best shown by FIGS. 3 and 4, backlash prevention system 12 is supported along one side of reel 10. In particular, magnet 60 is mounted to an axial face of spool 16 while electroconductive member 66 of sensor 40 and electroconductive member 68, 70, 72, 74, 76, 78 and 80 of braking mechanism 46 are coupled to frame 14 circumferentially spaced about magnet 60. Electroconductive members 66, 68, 70, 72, 74, 76, 78 and 80 preferably comprise electroconductive coils supported by frame 14 about magnet 60. Each of members 66–80 is electrically coupled to microprocessor 44 by electrical conductors 90. Microprocessor 44, digital controller 52, resistor 84 and energy storage and supply circuit 48 are in turn electrically coupled to one another as shown in FIG. 2 by circuit board 92 which is mounted to the interior surface of frame 14. As can be appreciated, the physical embodiment of the exemplary schematic layout illustrated in FIG. 2 may have various alternative sizes, configurations and locations to reduce costs or to reduce space requirements.

As further shown by FIGS. 3 and 4, backlash prevention system 12 additionally includes a manual adjustment mechanism 96 for enabling manual adjustment of the braking force applied by braking mechanism 46. Manual adjustment mechanism 96 generally includes carrier guide 100, fasteners 102, carrier 104, knob or dial 106, bearing 108 and seal 110. As best shown by FIG. 4, carrier guide 100 is a generally annular ring mounted to frame 14 by fasteners 102. Guide 100 encircles carrier 104 and includes two opposite inwardly projecting keys 114.

Carrier 104 is a generally annular shaped member including exterior key ways 116 which matingly receive keys 114 of guide 100 to guide movement of carrier 104 axially towards or away from magnet 60. Carrier 104 additionally includes a plurality of outwardly extending detents 118 along its inner circumferential surface and an exterior threaded portion 120. Detents 118 are circumferentially spaced about the inner circumferential surface of carrier 104 and are sized for receiving and carrying electroconductive members 66, 68, 70, 72, 74, 76, 78 and 80 within the magnetic field of magnet 60. As can be appreciated, electroconductive members 66–80 may be attached to carrier 104 by any one of a variety of alternative mounting arrangements. Exterior threaded portion 120 extends about an outer circumferential surface of carrier 104 and within dial 106 so as to threadably engage dial 106.

Dial 106 is a generally circular cap projecting through frame 14 for manipulation by the person fishing. As best shown by FIG. 4, dial 106 includes inner bore 122, rim 124 and interior threaded portion 126. Inner bore 122 concentrically extends into dial 106 and receives bearing 123. Bearing 123, preferably a bushing, mounts within bore 122 and receives spool shaft 128. As a result, dial 106 rotates about the axis of spool shaft 128.

Rim 124 is integrally formed with dial 106 and radially extends outward to oppose an inner surface of frame 14. As a result, frame 14 engages rim 124 of dial 106 while the axial end of spool shaft 128 engages the axial end of bore 122 to axially maintain dial 106 relative to frame 14. Seal 110, preferably an annular gasket, is fitted between frame 14 and rim 124. Seal 110 and rim 124 prevent water and other contaminants from entering reel 10 about dial 106.

Interior threaded portion 126 of dial 106 extends along an inner circumferential surface of dial 106 opposite and in engagement with exterior threaded portion 120 of carrier 104. Because dial 106 is axially fixed relative to frame 14, rotation of dial 106 causes carrier 104 and electroconductive members 66, 68, 70, 72, 74, 76, 78 and 80 to move along the axis of spool shaft 128 towards or away from magnet 60. Movement of electroconductive member 68–80 towards spool 16 and towards magnet 60 increases the braking force applied to spool 16 when members 68–80 are electrically coupled across resistor 84. Conversely, movement of members 68–80 away from spool 16 and away from magnet 60 reduces the braking force applied to spool 16 by members 68–80 when members 68–80 are electrically coupled across resistor 84. Thus, manual adjustment mechanism 96 enables a person fishing to individually adjust the extent of braking assistance provided by backlash prevention system 12 depending upon the individual's skill level or the particular casting conditions. For example, manual adjustment mechanism 96 enables a beginner to maximize the amount of braking assistance provided by backlash prevention system 12 and also enables an expert to reduce or even eliminate the amount of braking assistance provided by backlash prevention system 12. As shown by FIG. 1, the exterior surface of frame 14 adjacent dial 106 preferably includes a plurality of graduation marks or indices 136 to indicate to the person fishing the location of members 66–80 relative to magnet 60 and the corresponding degree of braking assistance provided by backlash prevention system 12. As can be appreciated, various other marking systems, such as those using different color bands representing different skill levels, may be utilized.

Figure 5:
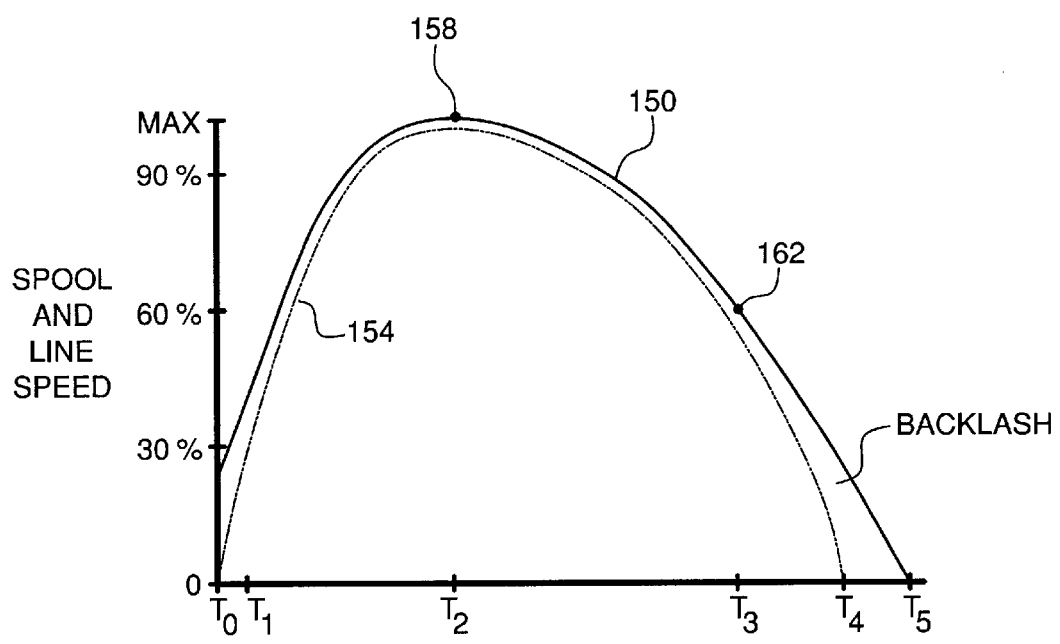
FIG. 5 is a graph of the spool and line speed over time during a typical cast of a bait or lure and line with the backlash prevention system unactuated.
Figure 6:
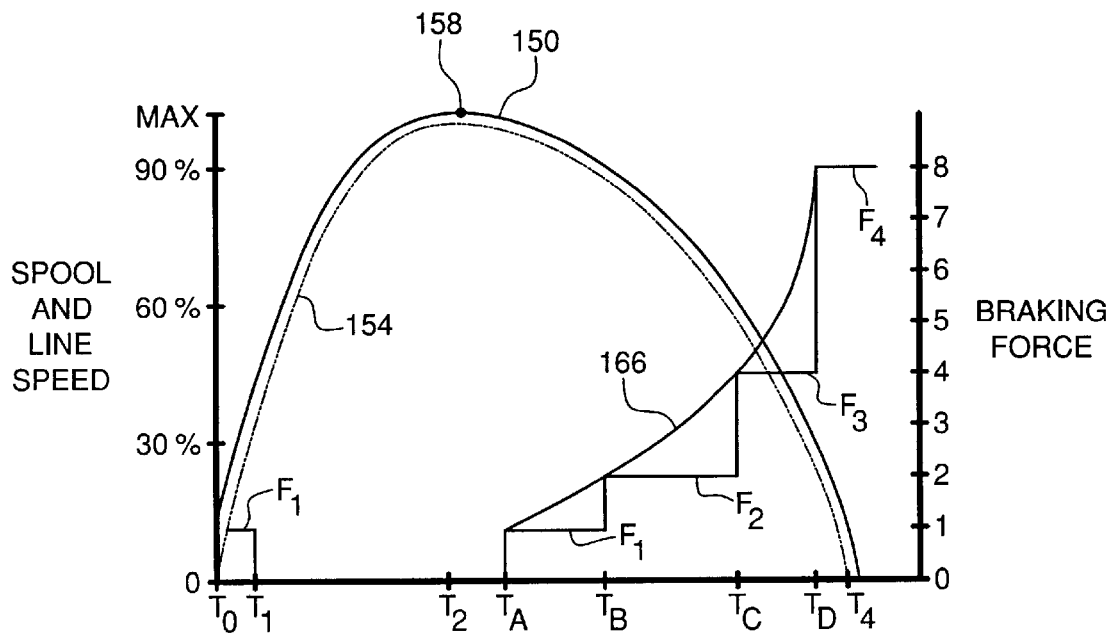
FIG. 6 is a graph of the spool and line speed over time during the cast of FIG. 5 with the backlash prevention system of FIGS. 1–4 actuated to apply a braking force as also graphically illustrated over time.

FIGS. 5 and 6 illustrate a typical cast of a bait or lure and line with backlash prevention system 12 unactuated and the same cast with backlash prevention system 12 actuated. FIG. 5 graphically illustrates the velocity of spool 16 over time (as indicated by solid line 150) and the velocity of the bait or lure and fishing line (as indicated by dashed line 154) over time. Although the exact slope and magnitude of 150 and 154 as well as the spacing between lines 150 and 154 will vary to some extent depending upon the particular casting conditions, the particular equipment and the particular individual making the cast, the speed of the spool and the speed of the bait or lure and line over time generally increase and decrease according to the graphical illustration of FIG. 5 absent any braking.

FIG. 5 represents a typical cast of a bait or lure and line without interference from large winds, trees or other obstacles which would otherwise drastically impact the velocity of the bait or lure and line over time. As shown by FIG. 5, it has been discovered that at the beginning of the cast, the initial whip of the fishing rod causes the bait or lure and line to initially yank on spool 16 which causes spool 16 to over-rotate at a velocity greater than the velocity of the bait or lure and fishing line. This difference between the rotational velocity of spool 16 and the bait or lure and line is depicted by the separation of lines 150 and 154 at the beginning of the cast just after time T0. As a result, this difference between the rotational velocity of spool 16 and the speed of the bait or lure and line may cause backlash of the fishing line released from spool 16 adjacent reel 10.

Shortly after the start of the cast, the velocity of the bait or lure and line and the rotational velocity of spool 16 will become approximately equal and then will continue to accelerate at the same rate until reaching a peak (generally indicated at point 158). Although lines 154 and 158 are shown individually for the sake of clarity, it is to be understood that lines 154 and 158 will overlap when the velocity of the bait or lure and fishing line is the same as the rotational velocity of spool 16. After a peak or maximum velocity is simultaneously attained by both spool 16 and the bait or lure and line, the rotational velocity of spool 16 and the velocity of the bait or lure and line begins to decelerate. The rate of deceleration of both spool 16 and the bait or lure and line is substantially the same until Time T3 corresponding to point 162. At Time T3, the overall velocity of the bait or lure and line (as indicated by line 154) begins decelerating at an increased rate due to the linear or horizontal component of the overall velocity of the bait or lure and line substantially approaching zero. However, at the same time, spool 16 decelerates at a substantially constant rate. As a result, the bait or lure and line decelerates at a much greater rate than the deceleration rate of spool 16. This resulting difference between the rotational velocities of spool 16 and the bait or lure and line is indicated by the separation of lines 150 and 154 after Time T3. Because spool 16 continues to release fishing line at a rate much greater than demanded by the decelerating bait or lure, excess fishing line or backlash builds up about reel 10.

At Time T4, corresponding to point 162, the bait or lure and line hits the water and its overall velocity becomes zero. Even after the velocity of the bait or lure and line becomes zero due to the bait or lure hitting the water, spool 16 continues to rotate.

FIG. 6 graphically illustrates backlash prevention system 12 controlling the application of braking force by braking mechanism 46 to spool 16 over time during the cast illustrated in FIG. 5. As shown by FIG. 6, depressment of clutch lever 30 (shown in FIG. 1) disengages clutch 26 in a conventionally known manner and actuates backlash prevention system 12. As shown by FIG. 6, upon the actuation of backlash prevention system 12 at Time T0, microprocessor 44 serves as a switch by electrically coupling at least one of members 66–80 across resistor 84 such that braking mechanism 46 applies a braking force F1 to spool 16. In the exemplary process illustrated, microprocessor 44 electrically couples a single member 68 across resistor 84 to cause braking mechanism 46 to apply a relatively small braking force F1 to spool 16. Braking mechanism 46 applies braking force F1 to spool 16 from Time T0 to preferably Time T1 at which point the velocity of spool 16 and the velocity of the bait or lure and line naturally become equal to one another.

In lieu of automatically actuating braking mechanism 46 to apply braking force F1 to spool 16 in response to depressment of clutch lever 30, microprocessor 44 may alternatively initially actuate braking mechanism 46 to apply an initial braking force F1 to spool 16 a short time following the start of the cast and prior to Time T1. For example, microprocessor 44 may alternatively actuate braking mechanism 46 in response to receiving spool rotation signals from sensor 40 that indicate that spool 16 is rotating with a predetermined rotational velocity value or after a preselected period of time has elapsed following the time at which microprocessor 44 first receives signals from sensor 40 indicating that spool 16 has begun rotating.

To approximate Time T1 at which point the velocity of spool 16 and the velocity of the bait or lure and line become equal, microprocessor 44 is preprogrammed or preconfigured to electrically de-couple any and all of members 66–80 from across resistor 84 automatically in response to receiving spool rotation signals from sensor 40 that indicate that spool 16 is rotating with a predetermined rotational velocity value, for example, 200 revolutions per minute. Microprocessor 44 is preferably preprogrammed or preconfigured to provide the user with a choice of a plurality of preset rotational velocity values which the user may select depending upon the user's skill level or the user's anticipated casting force or the particular casting conditions, all of which may affect the actual value of Time T1. Alternatively, microprocessor 44 may be preprogrammed or preconfigured to electrically de-couple members 68–80 from across resistor 84 after a predefined amount of time has lapsed since Time T0. Once again, microprocessor 44 is preferably preprogrammed or preconfigured to allow the user to choose from amongst several preset time values. Once microprocessor 44 electrically de-couples each of members 68–80 from across resistor 84 at Time T1, spool 16 is permitted to freely rotate.

From Time T0 when clutch lever 30 is depressed until at least after Time T4 when clutch lever 30 is released to couple spool 16 to crank handle 22 and the spool drive means, sensor 40 continuously senses the rotation of spool 16 and generates spool rotation signals which are transmitted to microprocessor 44. Sensor 40 preferably continuously generates spool rotation signals and transmits the signals to microprocessor 44. Microprocessor 44 receives and counts the spool rotation signals from sensor 40 at preselected intervals, for example, 100 times a second. In a preferred embodiment, microprocessor 44 digitizes the analog signals received from sensor 40. Once digitized, microprocessor 44 can calculate the number of zero-crossings of the signals, each zero-crossing representing a switch at sensor 40 from one pole of magnet 60 to the other pole of magnet 60. Microprocessor 44 counts the number of zero-crossings over a specified time interval to determine the rotational velocity of spool 16. Each time microprocessor 44 calculates a rotational velocity, microprocessor 44 stores this velocity and compares it to the previously recorded rotational velocity to determine a rate of acceleration or deceleration. Over time, the microprocessor continuously calculates, compares, calculates, compares and so on. As a result, microprocessor 44 determines the rate of acceleration and deceleration of spool 16 from Time T0 to when clutch lever 30 is released.

In addition, microprocessor 44 is also able to determine a maximum rotational velocity of spool 16 and the time (Time T2) at which spool 16 has a maximum rotational velocity. This maximum rotational velocity is identified when microprocessor 44 first calculates a deceleration in receives and counts fewer spool rotational velocity at a preselected interval of time as compared to the number of signals received during the preceding interval of time. As can be appreciated, microprocessor 44 may be configured or preprogrammed to require greater than one successive time interval having a decreased velocity before identifying the maximum rotational velocity of spool 16 and Time T2 to avoid miscalculations due to electronic noise or otherwise.

As shown by FIG. 6, once microprocessor 44 determines that spool 16 has attained a maximum rotational velocity at Time T2 (the peak time), microprocessor 44 generates a braking signal to actuate braking mechanism 46 at Time TA following Time T2. In the exemplary embodiment of braking mechanism 46 disclosed, microprocessor 44 once again acts as an electrical switch by electrically coupling at least one of members 66–80 across electrical resistor 84 to cause braking mechanism 46 to apply a braking force to spool 16. In the preferred process illustrated, microprocessor 44 electrically couples a single electroconductive member 68 across resistor 84 such that braking mechanism 46 applies braking force F1 to spool 16. Because microprocessor 44 actuates braking mechanism 46 to apply a braking force to spool 16 after the peak time (Time T2) and after spool 16 has attained a maximum rotational velocity (as indicated by point 158), backlash prevention system 12 does not reduce the velocity of spool 16 and the substantially identical velocity of the bait or lure and line at the peak time. Thus, system 12 does not reduce casting distance.

Moreover, as shown by FIG. 5, the difference between the rotational velocity of spool 16 and the velocity of the bait or lure and line after the peak time (Time T2) is substantially zero. This difference between the velocity of spool 16 and the velocity of 70 the bait or lure and line constantly increases after the peak time unless appropriately braked. As shown by FIG. 6, microprocessor 44 accordingly increases the braking force applied to spool 16 after the peak time (Time T2) such that the rotational velocity of spool 16 equals the velocity of the bait or lure and line to prevent backlash. In particular, microprocessor 44 continues acting as a switch by electrically coupling an increasing number of members 66–80 across resistor 84 as the sensed rotational velocity of spool 16 decreases. In the exemplary process illustrated in FIG. 6, microprocessor 44 electrically couples a second member 70 across resistor 84 in response to receiving approximately ten percent fewer signals or pulses from sensor 40 as compared to a maximum number of zero-crossings sensed by microprocessor 44 during a particular time interval. In other words, microprocessor 44 electrically couples second member 70 across resistor 84 when the rotational velocity of spool 16 is 90% of the previously identified maximum rotational velocity of spool 16. As a result, at Time T3, mechanism 46 applies larger braking force F2 to spool 16. In response to receiving 40% fewer zero-crossings from sensor 40, microprocessor 44 electrically couples third and fourth members 72 and 74 across resistor 84 to apply a larger braking force F3. In other words, microprocessor 44 electrically couples members 72 and 74 across resistor 84 at Time TC when spool 16 has a rotational velocity 60% that of the earlier identified maximum rotational velocity of spool 16 during the cast. Finally, in response to receiving 70% fewer zero-crossings during a particular time interval as compared to the maximum number of zero-crossings received during a particular time interval of the cast, microprocessor 44 electrically couples four additional members 76, 78, 80 and 66 across resistor 84 to apply a larger braking force F4. In other words, microprocessor 44 electrically couples four additional members 76, 78, 80 and 66 across resistor 84 at Time TD when spool 16 has a rotational velocity 30% that of its earlier identified maximum rotational velocity. In this particular case, microprocessor 44 electrically couples electroconductive member 66 across resistor 84 such that member 66 serves as both counter for sensor 40 and a braking component of braking mechanism 46.

Thus, as shown by FIG. 6, once the maximum rotational velocity of spool 16 has been identified by microprocessor 44, microprocessor 44 actuates braking mechanism 46 to discretely step up the amount of braking force applied by braking mechanism 46 to spool 16. Microprocessor 44 controls braking mechanism 46 such that braking mechanism 46 applies braking force to spool 16 at times and in amounts to approximate the ideal braking force over time as indicated by line 166. To better approximate the ideal braking force over time as shown by line 166, braking mechanism 46 may include additional electroconductive members similar to members 66–80 within the magnetic field of magnet 60, may include additional resistors 84 or may include a variable resistance device such as a potentiometer or transistor which would allow microprocessor 44 to control braking mechanism 46 to increase the braking force applied to spool 16 in smaller increments.

Because microprocessor 44 controls braking mechanism 46 to actuate braking mechanism 46 and to increase the braking force applied by braking mechanism 46 based solely upon sensed attributes of the particular cast, namely, a maximum rotational velocity of spool 16 during the cast and the particular sensed rotational velocities of spool 16 which occur thereafter during the same cast, backlash prevention system 12 applies an appropriate amount of braking force to spool 16 such that spool 16 rotates with the same velocity as the velocity of the bait or lure and line regardless of the change in velocity of the bait or lure and line over time (i.e. regardless of the shape, magnitude or slope of line 154 shown in FIGS. 5 and 6). For example, if the bait or lure and line hits a tree or other obstacle, the velocity of the bait or lure and line will immediately decelerate. As a result, unless appropriately braked, spool 16 will continue to rotate releasing excess line which may result in backlash. Backlash prevention system 12 senses the deceleration and will automatically actuate braking mechanism 46 to brake the rotation of spool 16. The faster that the bait or lure and line decelerates, the faster the backlash prevention system 12 will increase the braking force applied to spool 16 by braking mechanism 46. The same holds true when the bait or lure is cast against a strong wind or conversely when the bait or lure and line is cast with a strong wind. Likewise, backlash prevention system 12 automatically adapts to variations in the maximum rotational velocity of spool 16 due to a heavier or lighter bait or lure and line or due to a stronger or weaker cast of the bait or lure and line by the user. Although backlash prevention system 12 automatically adapts to varying casting conditions, varying equipment and varying users (because backlash prevention system 12 relies solely upon sensed information regarding the rotation of spool 16), the optimum amount of braking force as well as the precise timing of the application of the braking force to spool 16 will still vary to some extent depending upon the environmental casting conditions as well as the weight of the equipment such as the weight of the spool, the bait or lure and the fishing line.

II. Backlash Prevention System 212

Figure 7:
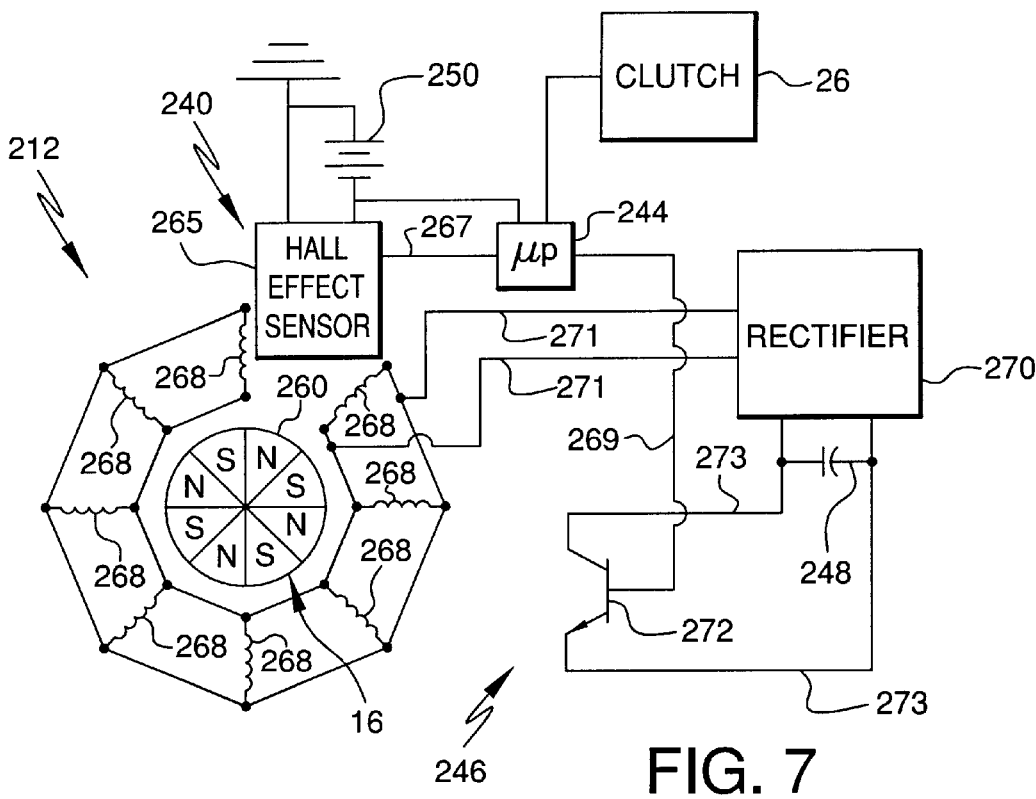
FIG. 7 is a schematic view illustrating a second embodiment of the backlash prevention system of FIG. 2.

FIG. 7 illustrates backlash prevention system 212, an alternative embodiment of backlash prevention system 12. Backlash prevention system 212 generally includes sensor 240, digital controller 244, braking mechanism 246, capacitor 248 and battery 250. Sensor 240 is located and configured to sense rotation of spool 16 and to generate signals representing rotation of spool 16 over time. In the exemplary embodiment illustrated, sensor 240 comprises a multiple pole magnet 260 coupled to spool 16 for rotation with spool 16 and Hall Effect sensor element 265 supported within the magnetic field of magnet 60. Hall Effect sensor element 265 is conventionally known and is electrically powered by battery 250. Hall Effect sensor element 265 creates a digital signal in a conventionally known manner in response to the changing magnetic field of magnet 260 as spool 16 rotates. The digital signal, representing rotation of spool 16, is transmitted to digital controller 244 by conductive lead 267.

Digital controller 244 comprises a conventionally known processor chip supported within reel 10 and operably connected to clutch 26, Hall Effect sensor element 265 and braking mechanism 246. Digital controller 244 is actuated upon disengagement of clutch 26. Alternatively, digital controller 244 or sensor 240 may be selectively actuated by other buttons or switches. Digital controller 244 acts as a counter, a timer, a memory device, a comparator, and a controller. Serving as a counter and a timer, digital controller 244 continuously counts the number of digital pulses received from sensor 240 during predetermined time intervals. Serving as a memory device, digital controller 244 stores or records the rotational velocity of spool 16 for each time interval. Serving as a comparator, digital controller 244 compares the rotational velocity of spool 16 during each consecutive time interval to identify a maximum rotational velocity of spool 16 during a cast and to identify a peak time at which spool 16 rotates with a maximum rotational velocity. Serving as a controller, microprocessor actuates braking mechanism 246 based upon the identified peak time at a point in time following the identified peak time. In the particular embodiment illustrated, digital controller 244 transmits a control voltage to break mechanism 246 via conductor 269. This control voltage serves as a braking signal which controls the amount of braking force applied by braking mechanism 246.

Braking mechanism 246 applies the braking force to spool 16 to slow rotation of spool 16 in response to braking signals from digital controller 244. In the embodiment illustrated, braking mechanism 246 includes magnet 260, electroconductive member 268, rectifier bridge 270 and transistor 272. Magnet 260 preferably comprises a permanent multi-pole magnet coupled to spool 16 for rotation with spool 16. Magnet 260 provides a magnetic field. Alternatively, separate and distinct magnets may be individually provided for sensor 240 and braking mechanism 246.

Electroconductive members 268 are made from an electroconductive material and are supported adjacent to spool 16 within the magnetic field of magnet 260. Electroconductive members 268 are preferably non-magnetic so as to avoid the creation of eddy currents which would continually and uncontrollably brake spool 16. Electroconductive members 268 preferably comprise copper coils or windings equidistantly spaced and circumferentially distributed about spool 16 and magnet 260. Braking mechanism 246 preferably includes eight members 268 positioned about spool 16. Electroconductive members 268 are electrically coupled in parallel to rectifier bridge 270 via conducive leads 271.

Rectifier bridge 270 is conventionally known and is electrically coupled to transistor 272 via conductive leads 273. Rectifier bridge 270 converts an alternating current received via leads 271 to a direct current which is transmitted to transistor 272. Capacitor 248 comprises a conventionally known capacitor electrically coupled between leads 273. Capacitor 248 smoothes current peaks or fluctuations.

Transistor 272 transmits electrical current through a semiconductive resistance which varies based upon control voltage signals received from digital controller 244. Transistor 272 preferably has a semiconductive electrical resistance which varies from an extremely large amount such as one megohm to a relatively small amount such as 100 ohms or less. In the exemplary embodiment, transistor 272 comprises a conventionally known bipolar junction transistor. Alternatively, transistor 272 may comprise other conventionally known power semiconductor devices which transmit an electrical current across a varying resistance based upon an electrical control signal such as MOS FET, IGBT, MCT and silicon carbide power semiconductor devices. As will be appreciated, rectified bridge 270 may be omitted if transistor 272 comprises a MOS FET power semiconductor device or similar devices which bi-directionally conduct current.

Backlash prevention system 212 functions as follows. Upon the depressment of clutch 26, digital controller 244 is actuated. Once the fishing line is cast, spool 16 and magnet 260 rotate to create a constantly changing magnetic field through members 268. This change in magnetic field in turn induces an alternating electrical current which is transmitted to rectifier bridge 270 by leads 271. Rectifier bridge 270 converts the alternating current into a direct current which is transmitted to transistor 272 by leads 273. Depending upon the sensed rotational velocity of spool 16 as sensed by sensor 240, digital controller 244 generates a control voltage signal which is transmitted to transistor 272 via conductor 269. The control voltage signal transmitted to transistor 272 will vary the electrical resistance of transistor 272 to correspondingly vary the load or braking force applied to spool 16 and magnet 260 by members 268. In particular, as the resistance of transistor 272 is reduced by digital controller 244, the braking force applied to spool 16 by braking mechanism 246 increases. Conversely, as the electrical resistance of transistor 272 is increased by digital controller 244, the braking force applied to spool 16 by braking mechanism 246 decreases. This electrical resistance of transistor 272 is controlled by digital controller 244 by selectively applying different control voltages to transistor 272. As a result, based upon the control voltages transmitted to transistor 272 via conductor 269, digital controller 244 may selectively brake the rotation of spool 16 as well as selectively increase or decrease the braking force applied to spool 16 by braking mechanism 246 based upon the sensed rotational velocity of spool 16.

In the exemplary embodiment illustrated, digital controller 244 is configured to control braking mechanism 246 such that braking mechanism applies a braking force to spool 16 based upon the sensed velocity of spool 16 according to the relationship illustrated in FIG. 6. In particular, controller 244 transmits a varying control voltage to transistor 272 to correspondingly vary the resistance of transistor 272 such that braking mechanism 246 applies an initial braking force F1 until time T1 at which point in time digital controller 244 transmits a control voltage to transistor 272 such that the electrical resistance of transistor 272 is sufficiently high enough such that braking force created by braking mechanism 246 is approximately zero. Once the maximum rotational velocity of spool 16 has been identified as indicated by point 158 at time T2, digital controller 244 will once again transmit a control voltage to transistor 272 such that braking mechanism 246 applies a braking force F1 to spool 16. As digital controller 244 receives signals from sensor element 265 indicating the reduced rotational velocity of spool 16, digital controller 244 will continuously vary the control voltage transmitted to transistor 272 such that braking mechanism 246 will apply an increasing braking force to spool 16. By transmitting a continuously changing control voltage to transistor 272 to correspondingly reduce the electrical resistance of transistor 272, digital controller 244 gradually and smoothly increases the braking force applied to spool 16 as shown by line 166 in FIG. 6. As will be appreciated, digital controller 244 may be programmed or configured to cause braking mechanism 246 to apply different braking forces at different times to spool 16.

In lieu of transmitting a constantly varying control voltage to transistor 272 to vary the braking force applied to spool 16 by braking mechanism 246, digital controller 244 may alternatively include a pulse-width modulator configured such that digital controller 244 transmits pulse-width modulated voltage control signals to transistor 272 to vary the braking force applied by braking to spool 16.

III. Backlash Prevention System 312

Figure 8:
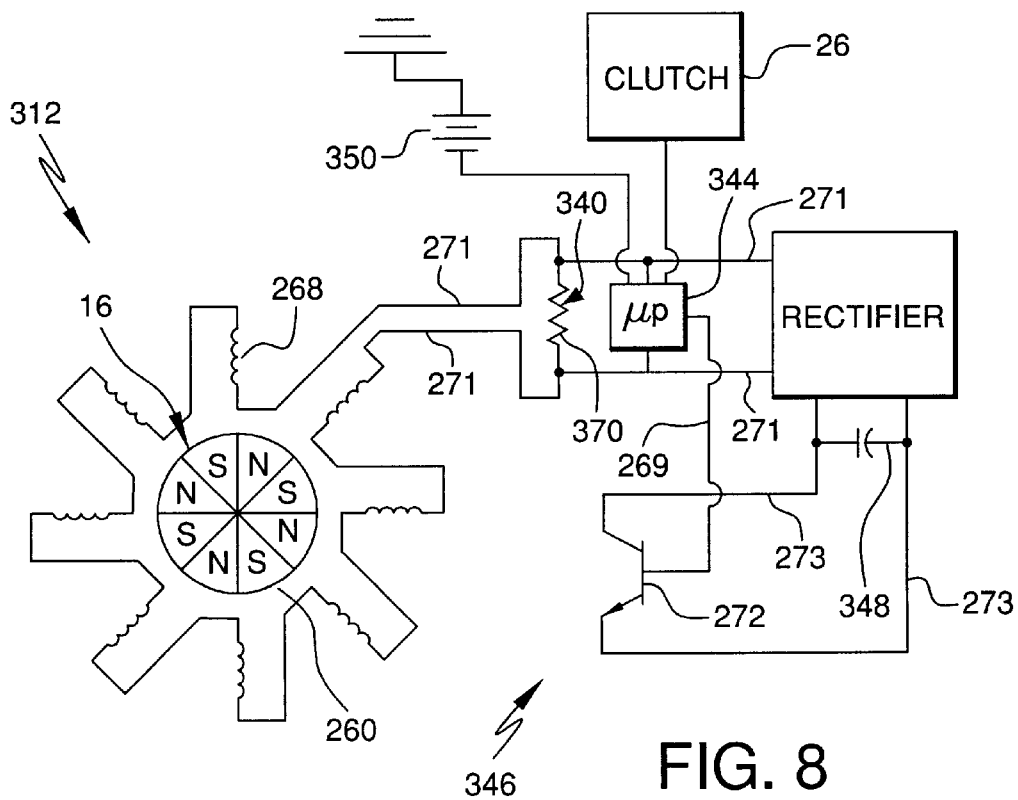
FIG. 8 is a schematic view illustrating a third embodiment of the backlash prevention system of FIG. 2.

FIG. 8 is a schematic view illustrating backlash prevention system 312, a third embodiment of backlash prevention system 12. Backlash prevention system 312 includes sensor 340, digital controller 344, braking mechanism 346, capacitor 348, and battery 350. Sensor 340 is located and configured to sense rotation of spool 16 and to generate signals representing rotation of spool 16 over time. Sensor 340 is similar to sensor 40 illustrated in FIG. 2 except that sensor 340 utilizes each of a plurality of electroconductive members 268 electrically coupled in series about spool 16 and magnet 260 to generate signals representing the rotation of spool 16. Electrical resistor 370 is electrically coupled in parallel with members 268 and preferably has a resistance large enough so as to create a de minimis loading on spool 16 by members 268. In the exemplary embodiment illustrated, resistor 370 preferably has a resistance of approximately one megohm. Because members 268 are electrically coupled in series with one another, the voltage induced across resistor 370 by the rotation of spool 16 and magnet 260 adjacent members 268 is larger. Alternatively, members 268 may be electrically coupled in parallel with one another (similar to that shown in FIG. 7) such that the voltage induced across resistor 370 is smaller. This sinusoidal voltage or amplitude across resistor 370 is sensed to produce a signal which is utilized by digital controller 344 to continuously identify the rotational velocity of spool 16 over time.

Digital controller 344 preferably comprises a conventionally known processor element or chip supported within reel 10 and operably connected to sensor 40 and braking mechanism 46. Digital controller 344 is powered by battery 350. Digital controller 344 actuates braking mechanism 346 based upon signals from sensor 340. Digital controller 344 acts as a timer, a memory storage device, a comparator, and a controller. As will be appreciated, each of these functions provided by digital controller 344 may alternatively be provided by multiple microprocessor chips as well as by other well known discrete electrical components which provide the same individual functions alone or in combination.

To identify the rotational velocity of spool 16, digital controller 344 is electrically coupled to members 268 in parallel with resistor 370. Digital controller 344 continuously senses the voltage across resistor 374 to continuously determine the rotational velocity of spool 16 over time. In the exemplary embodiment illustrated, digital controller 344 includes a conventionally known volt meter. Alternatively, digital controller 344 may comprise other well known voltage sensing devices. Moreover, digital controller 344 may alternatively be configured to sense the amplitude of the voltage signal across resistor 374 so as to continuously determine the rotational velocity of spool 16 over time. Furthermore, in lieu of detecting the voltage or amplitude across resistor 370, digital controller 344 may alternatively be configured to sense and count the frequency of electrical pulses induced across resistor 370 as spool 16 and magnet 260 rotate relative to members 268. In such an alternative arrangement, digital controller 344 would preferably include a signal conditioning mechanism such as an analog to digital converter for converting the sinusoidal electrical pulses across resistor 370 into digital square waves to facilitate improved counting of the pulses.

As the rotational velocity of spool 16 is continuously identified by digital controller 344, digital controller 344 also serves as a timer and a memory storage device by storing data representing the rotational velocity of spool 16 for each predetermined time interval during a particular cast. This stored value representing the rotational velocity of spool 16 comprises the particular voltage value induced across resistor 370 during the particular time interval. As noted above, this stored value may alternatively comprise the sensed frequency or the sensed amplitude across resistor 370 during the time interval.

Serving as a comparator, digital controller 344 compares the rotational velocity of spool 16 during each consecutive time interval to identify a maximum rotational velocity of spool 16 during a cast and to identify a peak time at which spool 16 rotates with the maximum rotational velocity. Serving as a controller, digital controller 344 actuates braking mechanism 346 based upon the identified peak time at a point in time following the identified peak time. Digital controller 344 also actuates braking mechanism 346 based upon the identified maximum rotational velocity of spool 16. In the exemplary embodiment, digital controller 344 includes a conventionally known pulse-width modulator which transmits varying controlled electrical pulses to braking mechanism 346 to control the amount of braking applied by braking mechanism 346.

Braking mechanism 346 is identical to braking mechanism 246 except that the electroconductive members 268 are electrically coupled in series with one another. As a result, the voltage induced by the rotation of spool 16 and magnet 260 relative to members 268 is larger. For ease of description, those remaining elements of braking mechanism 346 correspond to similar elements of braking mechanism 246 are numbered similarly.

Backlash prevention system 312 functions as follows. Upon the depressment of clutch 26, digital controller 344 is actuated. Once the fishing line is cast, spool 16 and magnet 260 will rotate to create a constantly changing magnetic field through members 268. This change in magnetic field will in turn induce an alternating electrical current which is transmitted to rectifier bridge 270 by leads 271. Rectifier bridge 270 converts the alternating current into a direct current which is transmitted to transistor 272 by leads 273. Depending upon the rotational velocity of spool 16, digital controller 344 generates a pulse-width modulated control voltage signal which is transmitted to transistor 272 by conductive conductor 269. The frequency and width of the voltage pulses transmitted to transistor 272 will vary the electrical resistance of transistor 272 to correspondingly vary load or braking force applied to spool 16 and magnet 260 by members 268. The control voltage signal transmitted to transistor 272 is such that transistor 272 will have an electrical resistance small enough so as to substantially brake the rotation of spool 16. By varying the frequency or length of time during which transistor 272 receives this voltage control signal, digital controller 344 correspondingly varies the braking of spool 16. For example to increase the braking force applied to spool 16, digital controller 344 adjusts the pulse-width modulated voltage control signal such that transistor 272 receives the control voltage ten percent of the time instead of five percent of the time. As a result, braking mechanism 346 brakes spool 16 ten percent of the time rather than five percent of the time. Conversely, digital controller 344 may also reduce the amount of braking applied to spool 16 in a similar fashion.

IV. Backlash Prevention System 412

Figure 9:
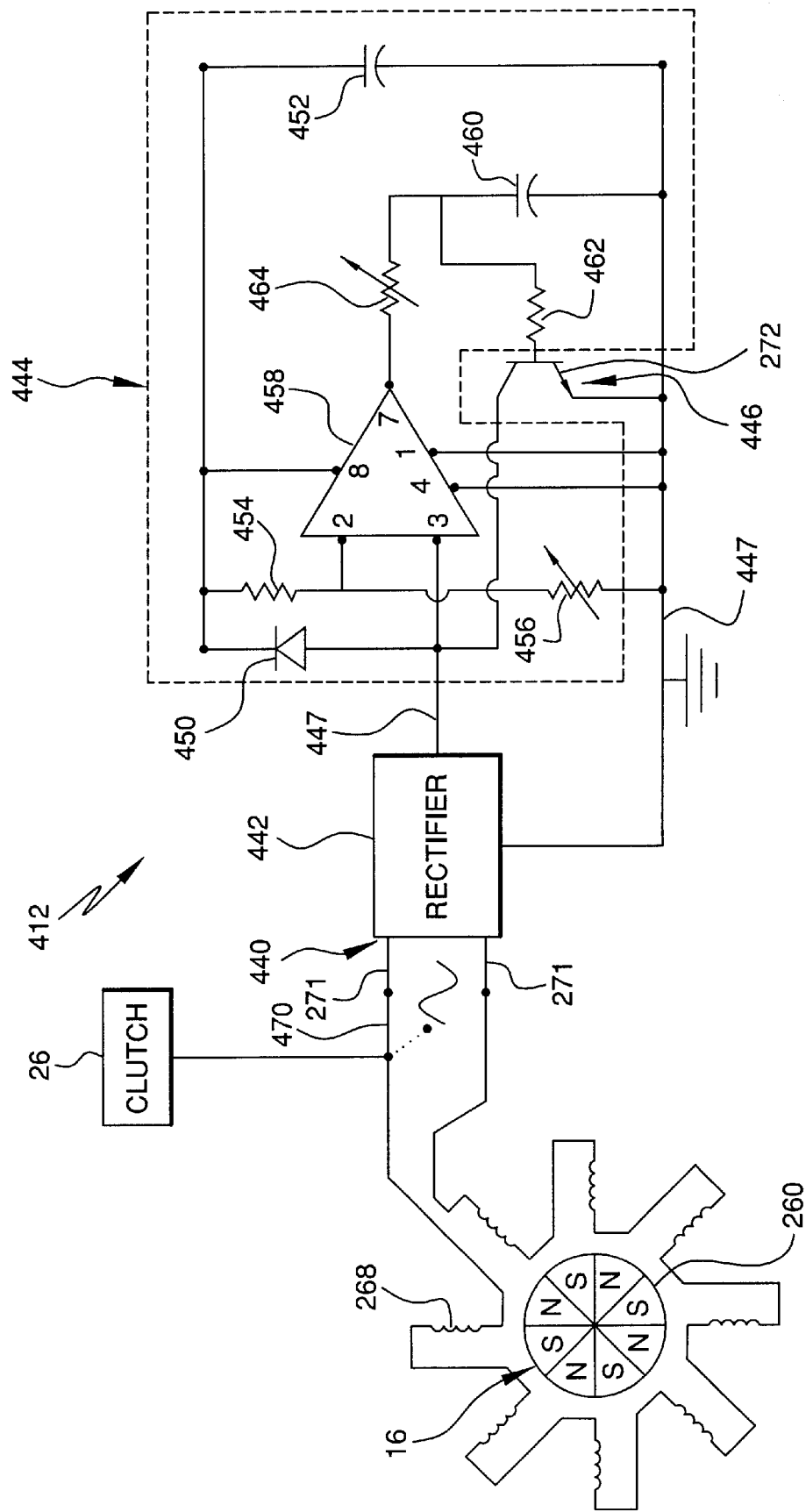
FIG. 9 is a schematic view illustrating a fourth embodiment of the backlash prevention system of FIG. 2.
Figure 10:
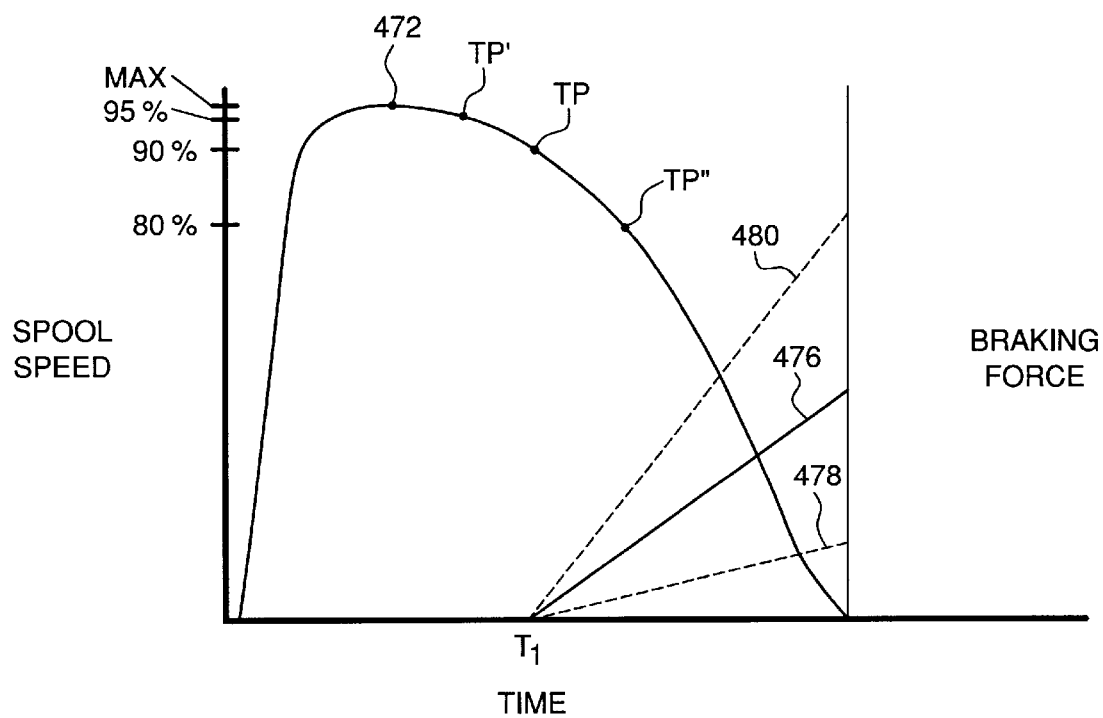
FIG. 10 is a graph of spool speed and applied braking force over time during a cast of the backlash prevention system of FIG. 9 actuated.

FIGS. 9 and 10 illustrate backlash prevention system 412, a fourth embodiment of backlash prevention system 112. FIG. 9 is a schematic view illustrating backlash prevention system 412 while FIG. 10 is a graph illustrating backlash prevention system 412 controlling the application of braking force to the spool 16 (shown in FIG. 8). Backlash prevention system 412 generally includes sensor 440, rectifier 442, analog controller 444, and braking mechanism 446. Sensor 440 comprises multiple pole magnet 260 coupled to spool 16 and a plurality of electroconductive members 268 within a magnetic field of magnet 260. Electroconductive members 268 are electrically coupled in series with one another to rectifier bridge 442 via electrical leads 271. Rotation of spool 16 and magnet 260 induces an alternating electrical current within electroconductive members 268 proportional to the rotational velocity of spool 16. Rectifier 442 converts the alternating current into a direct current in a conventionally known manner. Rectifier 442 may include a full-wave bridge rectifier comprising diodes, a capacitor, a resistor and/or other electrical components known in the art. The alternating current transmitted into rectifier 442 as well as the direct current output from rectifier bridge 442 both constitute signals representing the rotational velocity of spool 16. This direct current is transmitted to analog controller 444 via electrical leads 447.

Analog controller 444 performs many of the same functions as microprocessors 44, 244 and 344. Analog controller 444 generally includes diode 450, capacitor 452, resistors 454, 456, comparator 458, capacitor 460 and resistors 462, 464. First, analog controller 444 identifies a peak time at which spool 16 has a maximum rotational velocity. In the exemplary embodiment, analog controller 444 utilizes a diode 450 and a capacitor 452 to identify the maximum rotational velocity of spool 16. When spool 16 begins rotating, rectifier 442 generates a small positive voltage across leads 447. This voltage enables diode 450 to conduct current from anode to cathode, thereby charging capacitor 452. As the velocity of spool 16 increases, diode 450 continues to conduct electrical current to capacitor 452 such that the voltage across capacitor 452 continues to increase. When spool 16 reaches a maximum rotational velocity and starts decelerating, the voltage across leads 447 will decrease. Because the potential at the cathode of the diode is held substantially constant by capacitor 452, a drop in potential at the anode of the diode causes the diode to stop conducting current to capacitor 452. The maximum voltage obtained across capacitor 452 is proportional to and represents the maximum rotational velocity of spool 16 during a cast. Thus, diode 450 and capacitor 452 store a voltage representing the maximum rotational velocity of spool 16 during the cast. The maximum obtained voltage of capacitor 452 is transmitted to comparator 458.

Second, analog controller 444 actuates braking mechanism 446 after the maximum rotational velocity of spool 16 has been identified and after spool 16 has already begun decelerating. In the exemplary embodiment, analog controller 444 actuates braking mechanism 446 in response to receiving signals from sensor 440 indicating that spool 16 has a rotational velocity equal to a preselected percentage of the previously identified maximum rotational velocity of spool 16 during the cast. To this end, analog controller 444 includes resistors 454, 456 and comparator 458. Resistors 454 and 456 are electrically coupled in parallel with capacitor 452 with their common node coupled to pin two of comparator 458. Resistor 454 preferably has a fixed electrical resistance while resistor 456 preferably has a controllable variable resistance. Resistors 454 and 456 define a "trigger point" (TP) at which analog controller 444 actuates braking mechanism 446. In particular, the TP as a percentage of the maximum voltage across capacitor 452 is defined by the following equation:

$$TP = \frac{R_1}{R_1 + R_2} \times 100$$

where R2 is the resistance of resistor 454 and $R_1$ is the resistance of resistor 456. The TP can be adjusted by controllably adjusting the electrical resistance of resistor 456. Alternatively, the electrical resistance of resistor 456 may be selectively varied by another controller, such as a microprocessor. Moreover, resistors 454 and 456 may simply have a predetermined electrical resistance.

Comparator 458 comprises a conventionally known comparator component, such as a conventionally known LM311. In the exemplary embodiment in which the LM311 comparator is utilized, the electrical voltage of across capacitor 452 is input via pin number eight of comparator 458, the preset trigger percentage level from resistors 454 and 456 is input via pin number two, the DC voltage representing rotational velocity at any given time is input via pin number three, the output current is transmitted across pin number seven while pin numbers one and four are connected to ground. In a conventionally known manner, comparator 458 generates electrical current at pin number seven to actuate braking mechanism 446 in response to the electrical voltage at pin eight being equal to or less than the TP percentage of the maximum voltage stored at capacitor 452. The electrical current generated at pin number seven of comparator 458 acts as a braking signal from analog controller 444 to braking mechanism 446.

Third, analog controller 444 controls braking mechanism 446 such that braking mechanism 446 applies an increasing braking force to spool 16 in response to signals from sensor 440 indicating that spool 16 has a decreasing rotational velocity. In the exemplary embodiment, this is achieved using capacitor 460 and resistors 464, 462. As discussed above, once the electrical voltage at pin three (representing the actual rotational velocity of spool 16 during the cast) has decreased to a preselected percentage of the voltage across capacitor 452 at pin eight (representing the maximum rotational velocity of spool 16 during the cast), comparator 458 generates electrical current at pin number seven, through resistor 464 to capacitor 460. As capacitor 460 charges, the electrical voltage across capacitor 460 increases. This electrical voltage across capacitor 460 is transmitted to braking mechanism 446. The increasing voltage across capacitor 460 causes braking mechanism 446 through resistor 462 to increasingly brake spool 16. The braking force applied by braking mechanism 446 is proportional to the potential applied to braking mechanism 446. In the exemplary embodiment illustrated, resistor 462 has a fixed resistance while resistor 454 has a variable resistance. Adjusting the resistance of resistor 464, preferably a potentiometer, adjusts the rate at which analog controller 444 controls braking mechanism 446 to increase the braking force applied to spool 16 in response to detected deceleration of spool 16. The greater the resistance of resistor 4, the slower the charge of capacitor 460 and, therefore, the slower the rate at which the braking force increases. The electrical resistance of resistor 464 is preferably manually adjustable. Alternatively, the electrical resistance of resistor 464 may be selectively varied by another controller, such as a microprocessor. Alternatively, resistors 462 and 464 may simply have a predetermined electrical resistance.

Braking mechanism 446 is substantially identical to braking mechanism 246 except that braking mechanism 446 omits a dedicated rectifier bridge since the initial alternating current from sensor 440 has already been converted to a direct current by rectifier 442. Braking mechanism 446 includes magnet 260, electroconductive members 268 and transistor 272, which have previously been described with respect to backlash prevention system 212 illustrated in FIG. 7.

With reference to FIGS. 9 and 10, backlash prevention system 412 functions as follows. Depressment of clutch 26 actuates switch 470 to actuate backlash prevention system 412. Switch 470 may comprise either a mechanical or a solid state electronic switch. Once the fishing line is cast, spool 16 and magnet 260 rotate to create a constantly changing magnetic field through members. This change in magnetic field in turn induces an alternating current through members 268 which is transmitted to rectifier bridge 442 via leads 271. Rectifier bridge 442 converts the alternating current into a direct current which is transmitted to comparator 458 and diode 450. Acceleration of spool 16 induces a continually increasing electrical current which is transmitted through diode 450 to capacitor 452. As a result, the voltage across capacitor 452 also increases. Once spool 16 has reached a maximum rotational velocity as indicated by point 472 in FIG. 10, spool 16 will begin to decelerate which causes the electrical current induced in members 268 to decrease. In response to the decreasing electrical current received from sensor 440, diode 450 ceases conducting additional electrical current to capacitor 452 such that the electrical voltage across capacitor 452 remains substantially constant thereafter. This electrical voltage across capacitor 452 is transmitted to pin number eight of comparator 458. The electrical current induced within members 268 is constantly transmitted to pin number three of comparator 458. As shown by FIG. 10, after obtaining a maximum rotational velocity as indicated at point 472, spool 16 begins to decelerate. Once spool 16 has decelerated to a velocity such that the voltage at pin three is preselected percentage of the voltage across capacitor 452, comparator 458 generates electrical current at pin seven and passes this current to capacitor 460 and to transistor 272 to actuate braking mechanism 446. In the exemplary configuration of analog controller 444 which functions according to FIG. 10, analog controller 444 actuates braking mechanism 446 at time T1 in response to spool 16 having a rotational velocity approximately 90 percent of its previous identified maximum rotational velocity. By varying the electrical resistance of resistor 456, the trigger point TP may be adjusted anywhere within a range extending from TP' for responding to 95 percent of the maximum rotational velocity of spool 16 to TP" corresponding to 80 percent of the maximum rotational velocity of spool 16. As will be appreciated, this range for adjusting the trigger point TP at which controller 444 initially actuates braking mechanism 446 may have various alternative upward and lower bounds as desired, depending upon the resistances and variability chosen for resistors 454 and 456.

As shown by line 476, once braking mechanism 446 is actuated at time T1, controller 444 controls braking mechanism 446 such that braking mechanism 446 applies a constantly increasing braking force to spool 16. In particular, as capacitor 460 charges, the voltage across capacitor 460 increases. This increasing voltage which is transmitted to transistor 272 reduces the electrical resistance provided by transistor 272 so as to increasingly brake spool 16. By varying the electrical resistance of resistor 464, the rate at which the braking force applied to spool 16 is increased may be varied. For example, the rate of increase of braking force applied by braking mechanism 446 may be reduced to that as shown by dash line 478 or increased to that as shown by dash line 480.

V. Backlash Prevention System 512

Figure 11:
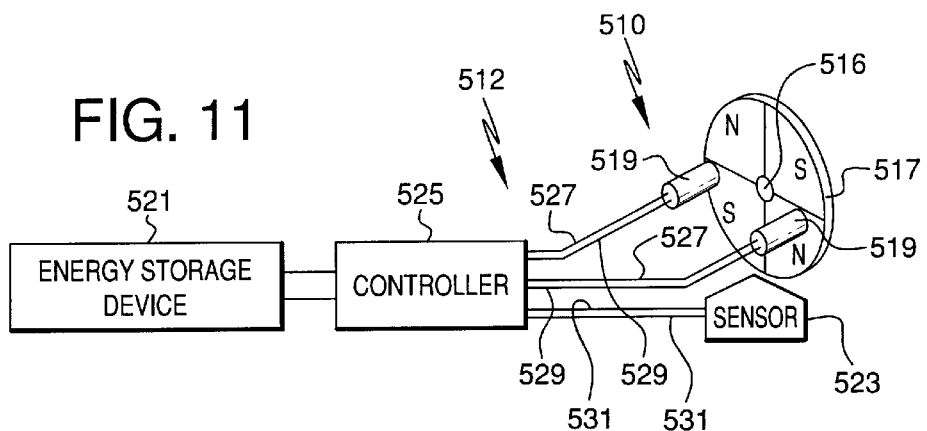
FIG. 11 is a schematic view illustrating a fifth embodiment of the backlash prevention system of FIG. 2.

FIG. 11 is a schematic view of backlash prevention system 512, a fifth alternative embodiment of backlash prevention system 12. Backlash prevention system 512 is configured for use with a bait cast fishing reel 510 having a spool 516. Backlash prevention system 512 generally includes magnet 517, non-magnetic electroconductive coils 519, energy storage device 521, sensor 523 and controller 525. Magnet 517 comprises a multi-pole permanent magnet generally affixed to an axial face of spool 516 proximate non-magnetic electroconductive coils 519. Magnet 517 produces a magnetic field which passes through coils 519. Because magnet 517 is affixed to spool 16, rotation of spool 516 during casting creates a varying magnetic field or flux through coils 519 as spool 516 rotates. In the exemplary embodiment, magnet 517 is illustrated as including a pair of opposite north poles and a pair of opposite south poles. As will be appreciated, magnet 517 may include a single north pole and a single south pole or a greater number of pairs of each of the north and south poles. Moreover, in lieu of being coupled to spool 516, magnet 517 may alternatively be supported by a frame (not shown) of the bait cast reel, wherein non-magnetic electroconductive coils 519 are affixed to spool 516 for rotation with spool 516.

Non-magnetic electroconductive coils 519 comprise two elongate coils of non-magnetic electroconductive material, such as copper, positioned within the magnetic field of magnet 517. Each coil 519 is formed by a helically wound wire having opposite ends electrically coupled to controller 525 by electric leads 527 and 529. As will be discussed in greater detail hereafter, controller 525 selectively electrically couples leads 527 and 529 to energy storage device 521.

Energy storage device 521 comprises one or more conventionally known components configured to store electrical energy. In the exemplary embodiment, energy storage device 521 includes a battery and a capacitor. Alternatively, energy storage device 521 may comprise a battery or a capacitor, alone, or various other conventionally known electrical energy storage components. Energy storage device 521 stores electrical energy induced in coils 519 and created by the relative rotation of spool 516 and magnet 517 during casting and provides a supply of electrical energy for braking the rotation of spool 516 to prevent backlash during a cast. Energy storage device 521 stores energy and supplies energy under the control of controller 525. Controller 525 selectively stores energy in energy storage device 521 or utilizes energy from energy storage device 521 to brake spool 516 based upon information provided by sensor 523.

Sensor 523 senses the rotational velocity of spool 516 over time during a particular cast and provides such information to controller 525 to enable controller 525 to selectively store energy produced by the rotation of spool 515 and to selectively brake the rotation of spool 516 to prevent backlash. In the exemplary embodiment, sensor 523 comprises a conventionally known Hall Effect sensor element supported by the frame (not shown) of reel 510 proximate to magnet 517 within the magnetic field of magnet 517. Sensor 523 is electrically coupled to controller 525 via leads 531.

Although sensor 523 is disclosed as preferably comprising a Hall Effect sensor element, sensor 523 may alternatively comprise any one of a variety of sensor elements configured to sense or detect the rotation of spool 516. For example, sensor 523 may alternatively comprise various other well-known sensors configured to sense the rotation of spool 516 by detecting changes in the magnetic field brought about by the rotation of magnet 517 and spool 516. Furthermore, sensor 523 may comprise other sensors which detect the rotation of spool 516 by means other than the changing magnetic field produced by the rotation of spool 516. For example, such an alternative sensor may comprise an appropriately situated light source, such as a light emitting diode, and a photoconductive sensor, wherein rotation of spool 516 causes the light received by the photoconductive member to vary.

Controller 525 electrically couples electric leads 527, 529 and coils 519 to energy storage device 521 based upon signals from sensor 523. In particular, controller 525 actuates between an energy storing state and a braking state based upon signals from sensor 523. In the energy storing state, controller 525 connects leads 527 and 529 to a conventionally known rectifier bridge (not shown), which is part of controller 525. The rectifier bridge converts the alternating electrical current to a direct electrical current. The direct current is then conducted to energy storage device 521 such that the electrical current induced in coils 519 during the rotation of spool 516 and magnet 517 is conducted to energy storage device 521 and stored in energy storage device 521. As a result, coils 519 and magnet 517 function as a generator creating electrical energy during the rotation of spool 516 and magnet 517 relative to coils 519. The energy generated is stored in energy storage device 521.

In the braking state, controller 525 electrically connects leads 527 and 529 to energy storage device 521 in a reverse manner such that electrical current flows from energy storage device 521 through leads 527 and 529 and through coils 519 in a reverse direction. In particular, controller 525 sequentially directs electrical current from electrical energy storage device across electroconductive coils 519. As a result, coils 519 have a reverse polarity such that coils 519 function similar to that of coils in a motor by applying a force to magnet 517 and to spool 516 in an opposite direction which tends to brake or slow the rotation of spool 516.

In the exemplary embodiment, controller 525 comprises a conventionally known processor chip, such as an Intel 80C196, supported within reel 510 and operably connected to the clutch of reel 510 (not shown), sensor 523, energy storage device 521, and coils 519. Controller 525 is actuated upon disengagement of the clutch. Alternatively, controller 525 may be selectively actuated by other buttons or switches. Once actuated, controller 525 acts as a counter, a timer, a memory device, a comparator and a controller. Upon depressment of the clutch, which signals the beginning of a cast, controller 525 electrically connects leads 527 and 529 of coils 519 to a rectifier bridge and to energy storage device 521 such that electrical current generated by the relative rotation of magnet 517 and coils 519 is conducted to and stored in energy storage device 521. While energy is being stored, controller 525 continuously counts the number of digital pulses received from sensor 523 during predetermined time intervals and stores or records the rotational velocity of spool 516 for each time interval. Digital controller 525 compares the rotational velocity of spool 516 during each consecutive time interval to identify a maximum rotational velocity of spool 516 during a cast and to identify a peak time at which spool 16 rotates with a maximum rotational velocity. Based upon an identified peak time, controller 525 switches the electrical connection between leads 527 and 529 to energy storage device 521 such that direct electrical current flows from energy storage device 521 alternately or sequentially through each of coils 519 in a reverse direction to provide coils 519 with a reverse polarity. As a result, instead of coils 519 and magnet 517 acting as a generator, energy storage device 521 and coils 519 now function as a motor opposing the relative rotation of magnet 517 and spool 516 to brake spool 516. To control the amount of braking force applied to magnet 517 and spool 516, controller 525 preferably includes a pulse width modulator to vary amount of electrical current supplied from energy storage device 521 to coils 519.

In the exemplary embodiment, controller 525 is programmed such that a braking force is applied to spool 516 as shown and described with respect to FIG. 6 based upon the identified maximum rotational velocity of spool 516 and the particular sensed rotational velocities of spool 516 thereafter. Similar to backlash prevention systems 12, 212, 312 and 412, backlash prevention system 512 automatically adapts to varying casting conditions. Backlash prevention system 512 is also simple and easy to manufacture and is controllable. Moreover, because backlash prevention system 512 stores energy created by the rotation of spool 516 and utilizes the same energy to brake the rotation of spool 516, backlash prevention system 512 eliminates or substantially reduces the need for additional power sources.

In the exemplary embodiment, coils 519 are preferably supported by the frame of reel 510 such that each coil 519 extends about an axis substantially perpendicular to the axial face of magnet 517 and spool 516. As a result, coils 519 do not substantially brake the rotation of spool 516 during a cast when controller 525 is in the energy storing state. Consequently, backlash prevention system 512 does not substantially reduce the rotational velocity of spool 516 during initial portions of a cast to substantially reduce the resulting casting distance. Although less desirable, backlash prevention system 512 may alternatively include greater than two coils 519 and may alternatively include coils 519 supported so as to extend about axes extending non-perpendicular to the axial face of magnet 517 and spool 516.

In addition to selectively generating and storing electrical energy created by the rotation of spool 516 and selectively utilizing such stored energy to appropriately brake the rotation of spool 516 to prevent backlash, backlash prevention system 512 also preferably enables the user to cast a lure or bait a distance substantially identical to the distance achieved by a previous cast. In particular, backlash prevention system 512 senses and stores the rotational velocity of spool 516 over time during a first cast and applies an appropriately timed braking force to spool 516 during a second cast such that the second cast achieves a distance substantially identical to the casting distance of the first cast. Preferably, a braking force is applied to spool 516 during the second cast such that spool 516 has a rotational velocity over time during the second cast substantially identical to the rotational velocity of spool 516 over time during the first cast. Alternatively, controller 525 may be programmed, in a conventionally known manner, to sense differences in the rotational velocity of spool 516 over time during the first cast and during the second cast and to apply an appropriately timed braking force with appropriate magnitude to spool 516 to adapt to and correct such differences such that the casting distances of the first and second casts are substantially identical even though the rotational velocities of spool 516 over time (such as shown in FIG. 6) are not identical to one another.

In particular, backlash prevention system 512 functions as follows when in a repeat cast mode. During a first cast, sensor 523 generates spool rotation signals representing rotation of spool 516 over time. In addition, sensor 523 senses the beginning of the first cast (when spool 516 has a velocity greater than zero). The signals produced by sensor 523 are transmitted to controller 525. Controller 525 includes a memory storage device which stores a point in time at which the first cast has begun and the rotational velocity values of spool 516 at particular points in time following the beginning of the cast. Release of the fishing reel clutch generates a signal indicating to controller 525 when the first cast has been completed. As a result, the rotational velocity of spool 516 over time, similar to the data shown the graph of FIG. 6, is stored for later use.

When the user wishes to achieve a subsequent cast having a distance substantially equal to the distance achieved by the stored first cast, the user depresses or otherwise moves a switch (not shown) which generates a signal which actuates controller 525 to a repeat cast mode. As a result, during the subsequent cast, controller 525 compares the rotational velocity of spool 516 at selected points in time with corresponding rotational velocity of spool 516 at the same points in time during the first cast and instantaneously changes the amount of braking force applied to spool 516 to equalize the rotational velocities of spool 516 during the first and second casts at the same particular point in time or nearly the same particular point in time. Alternatively, controller 525 is configured or programmed, in a conventionally known manner, to calculate an instantaneous casting distance estimate for the second cast, to compare the instantaneous casting distance estimate for the second cast with the desired first casting distance and to adjust the braking force applied to spool 516 so that the successive casting distance estimate substantially equals the desired first casting distance. Controller 525 continues to compare the rotational velocity of spools 516 during the second cast with the corresponding rotational velocity of spool 516 over time during the first cast and continuously adjusts the amount of braking force applied to spool 516 during the second cast based upon each comparison until the second cast has been completed as indicated by the release of the clutch. As a result, the second cast achieves a distance substantially equal to the distance achieved by the first cast.

Figure 12:
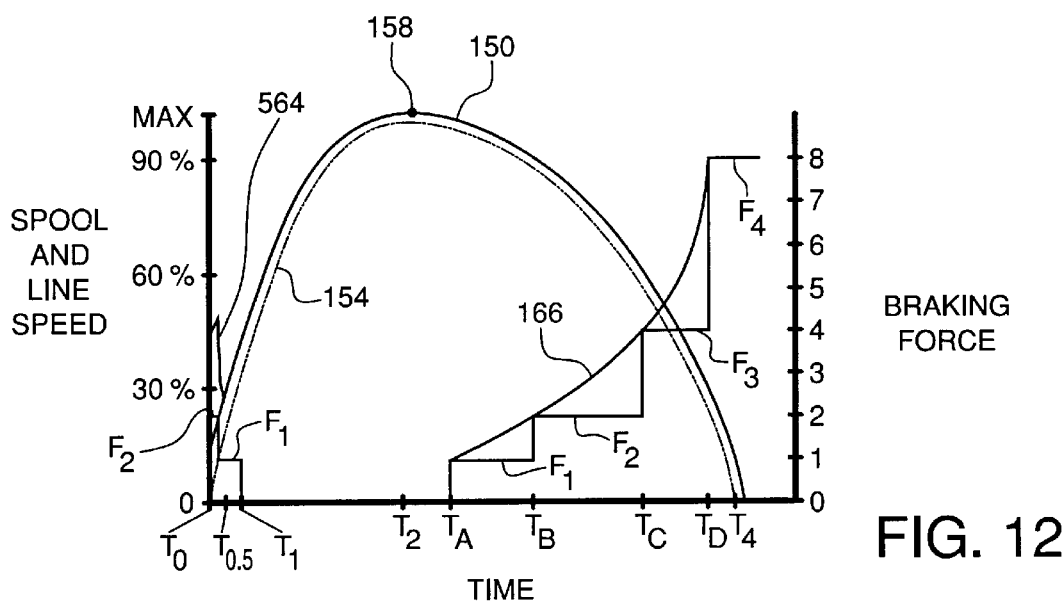
FIG. 12 is a graph of spool speed and applied braking force over time during a first cast and during a second cast when the backlash prevention system of FIG. 11 is in a repeat cast mode.

FIG. 12 graphically illustrates backlash prevention system 512 controlling the application of braking force to spool 516 over time during a first cast in which spool 516 is appropriately braked such that spool 516 and the fishing line have identical velocities over time (as indicated by lines 150 and 154) and during a second cast (as indicated by line 564). As shown by FIG. 12, controller 525 of backlash prevention system 512 sequentially conducts electrical current from energy storage device 521 through coil 519 to create a magnetic field or flux which interacts with magnet 517 (shown in FIG. 11) to oppose or resist the current rotational direction of spool 516 to brake the rotation of spool 516. In particular, backlash prevention system 512 utilizes a pulse width modulator to intermittently and sequentially supply electrical current through coil 519 to apply braking force F1 between times T0 and T1 and between times TA and times TB. Backlash prevention system 512 further applies forces F2, F3 and F4 from Time TB to Times TC, from Time TC to Time TB, and from Time TB to Time T4, respectively, to brake spool 516 such that spool 516 rotates with a velocity substantially identical to the velocity at which fishing line is released from spool 516. In short, backlash prevention system 512 brakes spool 516 in a similar fashion to the braking of spool 16 by backlash prevention system 12 (shown and described with respect to FIG. 6).

FIG. 12 further depicts a second cast which is thrown harder than the first cast such that spool 516 and the fishing line both have an identical velocity (indicated by line 564) approximately 50% greater than the initial starting velocity of the spool 516 and fishing line during the first cast. As a result, the second cast would normally result in a longer cast, possibly overshooting the target. However, backlash prevention system 512, upon detecting the initial difference between the second cast and the first cast applies a greater braking force F2 to spool 516 until system 512 receives signals from sensor 523 (shown in FIG. 11) indicating that spool 516 and the fishing line have an adjusted velocity substantially equal to or slightly less than the velocity of the spool 516 and the fishing line during the first cast at a corresponding point in time T0.5. After time T0.5, backlash prevention system 512 applies a braking force to spool 516 substantially identical to the braking force which was applied to spool 516 during the first cast. After time T0.5, spool 516 and the fishing line will exhibit a velocity over time identical to or slightly less than the velocity of spool 516 and the fishing line during the first cast as represented by lines 150 and 154. Backlash prevention system 512 preferably brakes spool 516 during the second cast such that spool 516 has a corresponding velocity slightly less than that of spool 516 during the first cast to account for any additional casting distance achieved during the short period of time in which spool 516 had a greater velocity. In addition to comparing the initial velocity of spool 516 and the fishing line during a second cast with that of a first cast and making appropriate adjustments, backlash prevention system 512 also continually compares and monitors the rotational velocity of spool 516 during the second cast with the stored values for the rotational velocity of spool 516 and fishing line during the first cast and makes adjustments throughout the second cast.

Figure 13:
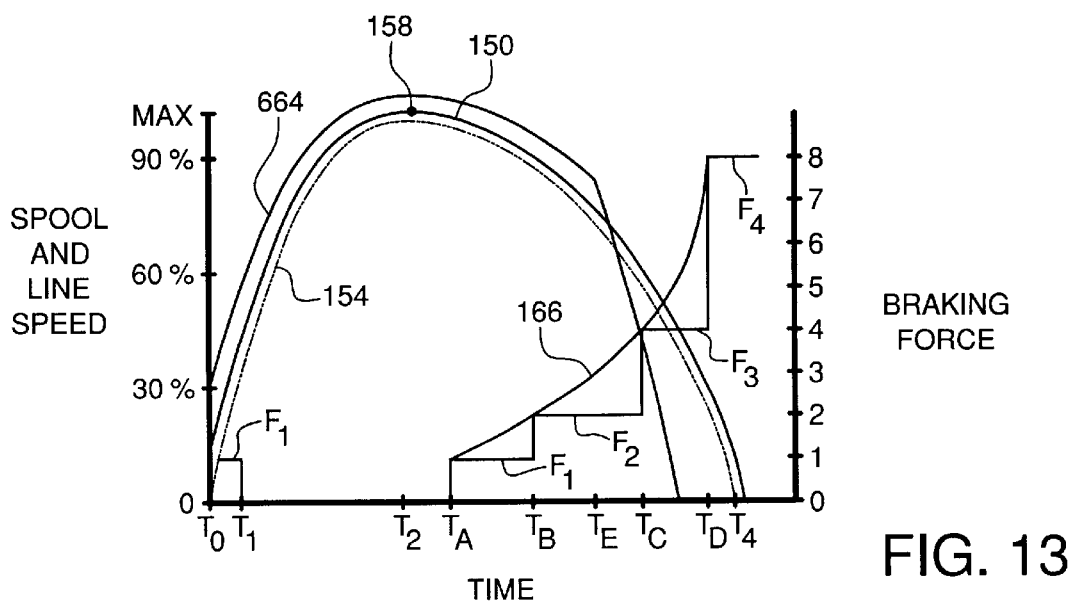
FIG. 13 is a graph of spool speed and applied braking force over time during a first cast and a third cast when the backlash prevention system of FIG. 11 is in a repeat cast mode.

FIG. 13 illustrates backlash prevention system 512 applying a braking force to spool 516 during a third cast over time (as graphically represented by line 664) to match the casting distance achieved by the first cast as represented by the area under lines 150, 154). As shown by FIG. 13, the third cast is thrown with a much greater force such that spool 516 and the fishing line has a velocity approximately twice that of the initial velocity of the spool 516 and the fishing line during the first cast. Backlash prevention system 512 applies a braking force to spool 516 during the third cast substantially identical to that applied to spool 516 during the first cast until time TE at which point backlash prevention system 512 applies a much greater braking force to spool 516 as compared to the first cast such that spool 516 and the fishing line rapidly decelerate. The additional amount of braking force applied to spool 516 is calculated by controller 525 based upon instantaneous casting distance estimates calculated by controller 525 continuously during the second cast using sensed rotational velocities of spool 516. The braking force applied to spool 516 has a magnitude and duration such that the resulting area under line 664 (representing the casting distance of the third cast) substantially equals the area under lines 150, 154 (representing the casting distance of the first cast). As will be appreciated, controller 525 may be alternatively configured or programmed to apply varying braking forces to spool 516 at varying times based upon stored data representing characteristics of an earlier first cast such that the casting distance achieved by the first cast and the second cast are substantially identical.

In the exemplary embodiment, controller 525 is preferably configured, in a conventionally known manner, to store the characteristics of a first cast for later use at any time even after several additional casts have been attempted since the first cast. As a result, the user may cast a lure or bait an optimal distance to an optimal position adjacent a shoreline structure while trolling past the shoreline structure. System 512 allows the user to continue trolling and to continue making several additional casts prior to reaching the generally same relative location with respect to the same shoreline structure. When the user has once again reached the same point during trolling as the first cast, the user simply actuates controller 525 to the repeat cast mode and casts the lure or bait at the same shoreline structure with at least the same force of the first cast. Controller 525 handles it from there by appropriately braking spool 516 such that the lure or bait fall to substantially the same optimal location along the shoreline structure.

Controller 525 is also preferably configured to enable the user to slightly adjust the characteristics of the second cast with respect to the first cast when in the repeat cast mode. For example, controller 525 is preferably configured to enable the user to dampen the relative velocity of the second cast as compared to the first cast by applying a slightly greater amount of braking force to spool 516 over time or at particular points in time such that the second cast has a distance less than the first cast. Alternative controller 525 may be actuated to apply a lesser braking force over time or at particular points in time as compared to the braking force applied to spool 516 during the first cast such that the second cast achieves a distance greater than the distance achieved by the first cast. The extent to which the second cast is dampened relative to the first cast or heightened relative to the first cast may be infinitely adjusted to provide the user with precise control over the second cast while using the first cast as a baseline.

Although backlash prevention system 512 is illustrated and described as (1) generating and storing electrical energy produced by the rotation of spool 516 and using the stored electrical energy to brake spool 516, and (2) as storing data representing the characteristics of a first cast and appropriately braking spool 516 during a second cast based upon the stored characteristic data of the first cast, backlash prevention system 512 may alternatively perform only one of the two noted functions. Moreover, each of systems 12, 212, 312 and 412 may likewise additionally be configured to provide a repeat cast function wherein the characteristics of a first cast are stored and later used to modify the characteristics of a second cast during the second cast.

FIGS. 14–16 illustrate fishing reel 610 including backlash prevention system 512. Fishing reel 610 comprises a bait cast reel substantially identical to fishing reel 10 as shown in FIGS. 1, 3 and 4 except that fishing reel 610 includes manual adjustment mechanism 596 in lieu of manual adjustment mechanism 96 and includes backlash prevention system 512 in lieu of backlash prevention system 12. For ease of illustration, those remaining components of fishing reel 610 which correspond to similar components of fishing reel 10 are numbered similarly.

Similar to manual adjustment mechanism 96, manual adjustment mechanism 596 enables manual adjustment of the braking force applied to spool 16 by backlash prevention system 512. However, in contrast to manual adjustment mechanism 96, manual adjustment mechanism 596 includes carrier 604 in lieu of carrier 104. The remaining components of manual adjustment mechanism 596 which are identical to manual adjustment mechanism 96 are numbered similarly. Carrier 604 is similar to carrier 104 except that carrier 604 supports non-magnetic electroconductive coils 519 such that coils 519 extend along axes extending substantially perpendicular to the axial face of spool 516. In particular, carrier 604 includes a pair of detents 518 extending parallel to spool 16 opposite magnet 517 which is affixed to the axial face of spool 16. Each detent 518 receives one of coils 519 and further includes passages therethrough (not shown) through which electrical leads 527 and 529 extend and are electrically connected to controller 525. As with manual adjustment mechanism 96, rotation of dial 106 causes carrier 604 and electroconductive coil 519 to move along the axis of spool shaft 128 towards or away from magnet 517. Movement of electroconductive coils 519 towards spool 516 and towards magnet 517 increases the braking force applied to spool 516 when controller 525 is in the braking state. Conversely, movement of coils 519 away from spool 516 and away from magnet 517 reduces the braking force applied to spool 516 by coils 519 when controller 525 is in the braking state. Manual adjusting mechanism 596 enables a person fishing to individually adjust the extent of braking assistance provided by backlash prevention system 512 depending upon the individual's skill level or the particular casting conditions. As shown by FIG. 11, the exterior surface of frame 14 adjacent dial 106 preferably includes a plurality of graduation marker indices 136 to indicate to the person fishing the location of coils 519 relative to magnet 517 and the corresponding degree of braking assistance provided by backlash prevention system 512. As can be appreciated, various other marking systems, such as those using different color bands representing different skill levels, may be utilized.

VI. Backlash Prevention System 712

Figure 17:
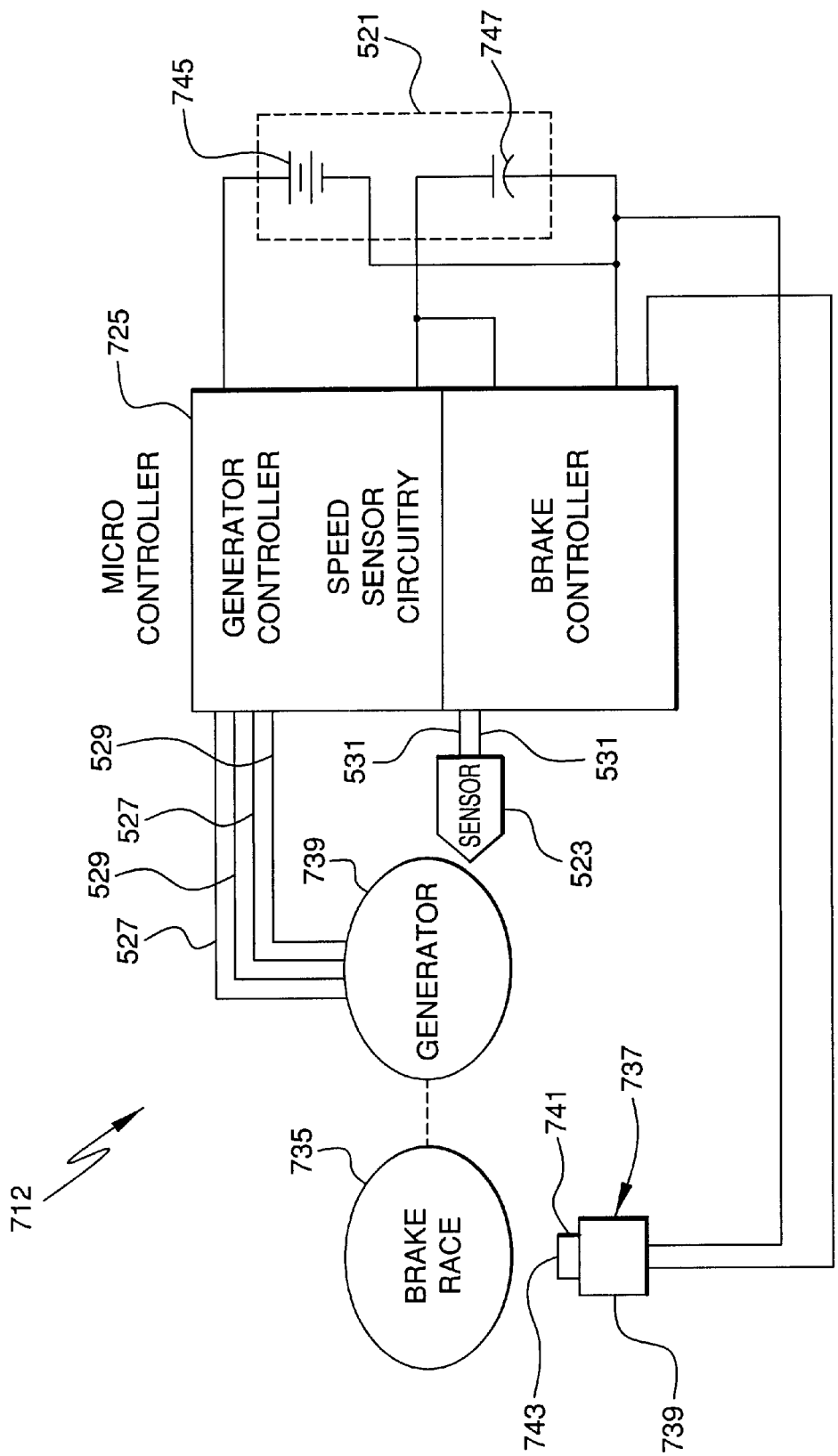
FIG. 17 is a schematic view illustrating a sixth embodiment of the backlash prevention system of FIG. 2.

FIG. 17 is a schematic diagram of backlash prevention system 712, a sixth alternative embodiment of backlash prevention system 12. Backlash prevention system 712 is similar to backlash prevention system 512 shown in FIGS. 11–15 except that backlash prevention system 712 includes controller 725 in lieu of controller 525 and additionally includes brake race 735 and braking mechanism 737. For ease of illustration, those remaining components of backlash prevention system 712 which correspond to similar elements of backlash prevention system 512 are numbered similarly. For further ease of illustration, magnet 517 (which is attached to an axial face of spool 516 shown in FIG. 11) and coils 519 are collectively depicted schematically as generator 739. Overall, system 712 operates in a similar fashion to system 512 except that system 712 utilizes brake race 735 and brake mechanism 737 in lieu of coils 519 and magnet 517 to brake spool 516. Similar to controller 525, controller 725 comprises a microprocessor (preferably an Intel 80C196) configured and/or programmed to brake the rotation of spool 516 based upon signals from sensor 523. However, in lieu of utilizing energy from energy storage device 521 to conduct electrical current through coils 519 such that coils 519 act as a motor opposing the rotation of spool 516, controller 725 uses the energy from energy storage device 521 to power and actuate braking mechanism 737 into frictional engagement with brake race 735 to brake the rotation of spool 516.

Brake race 735 comprises a high-friction surface formed as part of or otherwise affixed to spool 516 so as to extend opposite brake mechanism 737. Brake race 735 provides a surface which is brought into frictional contact with brake mechanism 737 to brake the rotation of spool 516. In the exemplary embodiment, brake race 735 comprises a circumferential outer surface extending about the axis of spool 516, whereby radial inward movement of brake mechanism 537 brings brake mechanism 537 into contact with brake race 735 to brake or slow the rotation of spool 516.

Brake mechanism 537 is electrically connected to controller 725 which powers brake mechanism 737 utilizing energy from energy storage device 521. Brake mechanism 737 includes actuator 740 and brake block 741 having brake surface 743. Actuator 740 preferably comprises an electric solenoid supported by the frame of the fishing reel and configured to selectively move surface 743 of braking block 741 into frictional engagement with brake race 735. In the exemplary embodiment, braking block 741 is formed from a high friction, resiliently compressible material such as natural or synthetic rubber. As will be appreciated, brake mechanism 737 may comprise any one of a variety of alternative braking mechanisms configured to selectively move a high friction surface against an adjacent high friction surface to provide braking against relative movement between the two surfaces. In lieu of comprising an electric solenoid, actuator 740 may comprise other well-known linear actuators.

Backlash prevention system 712 functions as follows. Depressment of the clutch of the bait cast fishing reel including backlash prevention system 712 actuates controller 725 which powers sensor 523. Sensor 523, preferably a Hall Effect sensor element, senses the beginning of the cast when spool 516 begins rotating. Sensor 523 transmits such electrical signals to controller 725 indicating the beginning of the cast as well as the rotational velocity of spool 516 at predefined time intervals. Controller 725 receives such signals from sensor 523 and continuously stores and compares the velocity signals from sensor 523 to calculate the rate of acceleration and deceleration of spool 516 over time and to calculate when in time spool 16 has a maximum rotational velocity. Based upon these calculations, controller 725 switches from an energy storing state to a braking state. In the energy storing state, controller 725 electrically couples leads 527 and 529 to a rectifier bridge (not shown) and ultimately to energy storage device 521 in an appropriate manner such that the electrical energy generated by the relative rotation of magnet 517 and coils 519 is conducted to and stored within energy storage device 521. In particular, electrical energy from generator 739 is stored in battery 745 and capacitor 747 of device 521. In the braking state, controller 725 electrically connects battery 745 and capacitor 747 of energy storage device 521 to braking mechanism 737 to actuate braking mechanism 737 and to power braking mechanism 737 utilizing the stored energy from energy storage device 521. In response to an electrical control signals from controller 725, actuator 740 moves braking surface 743 of block 741 into frictional engagement with brake race 735 to brake the rotation of spool 516 (shown in FIG. 11). The amount of braking force applied to spool 516 by braking mechanism 737 is varied by controller 725 by varying the amount of force in which surface 743 is held against the surface of brake race 735. In the exemplary embodiment, controller 725 controls brake mechanism 737 based upon the detected rates of acceleration and deceleration of spool 516 and the detected timing and magnitude of the maximum rotational velocity of spool 516 to apply an appropriate amount of braking force to spool 516 to minimize or prevent backlash. In particular, controller 725 is preferably configured or programmed to apply a braking force to spool 516 in accordance with the relationship depicted in the graph of FIG. 6.

VII. Backlash Prevention System 812

Figure 18:
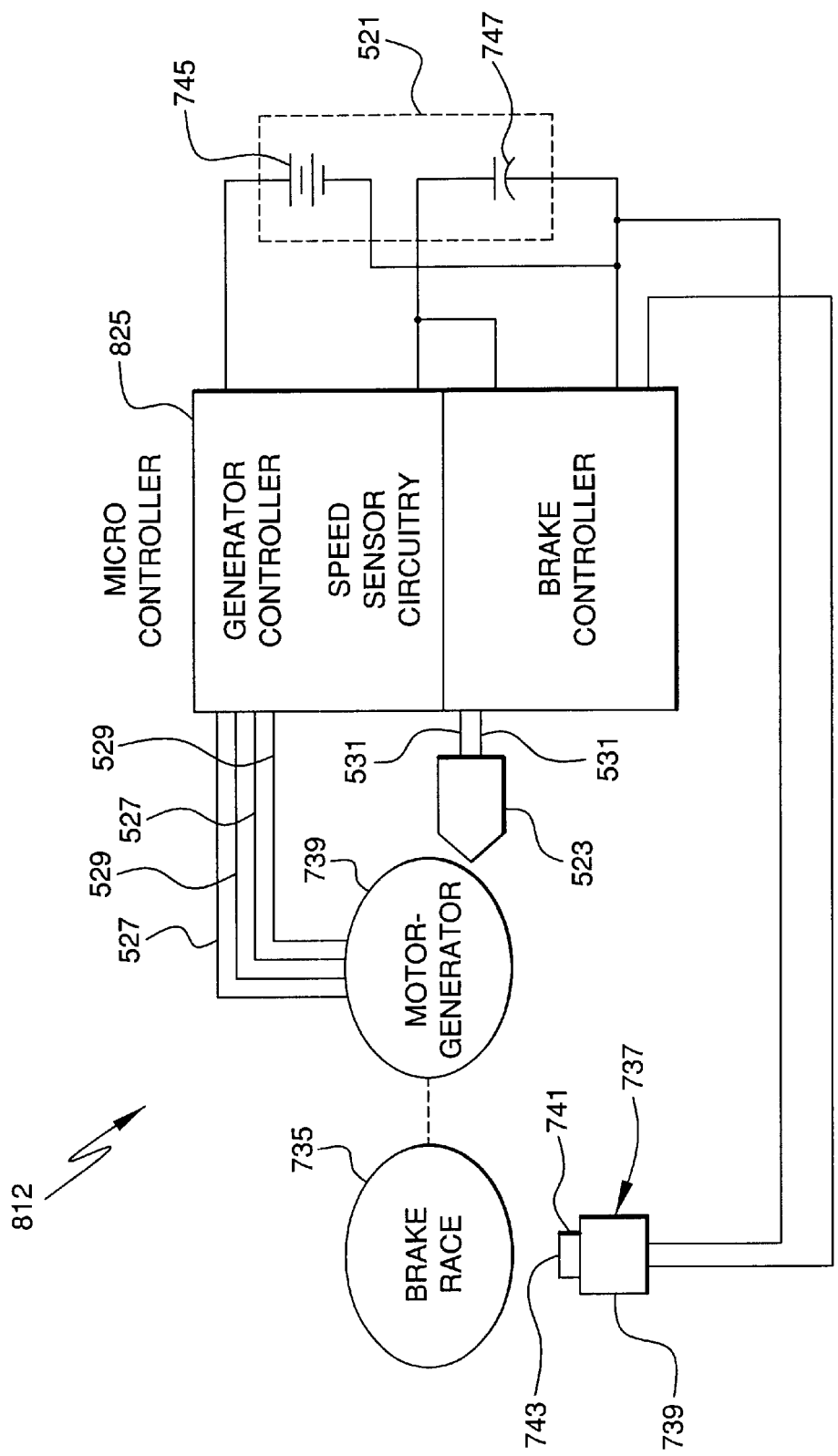
FIG. 18 is a schematic view illustrating a seventh embodiment of the backlash prevention system of FIG. 2.

FIG. 18 is a schematic diagram of backlash prevention system 812, a seventh alternative embodiment of backlash prevention system 12. Backlash prevention system 812 is substantially identical to backlash prevention system 712 except that backlash prevention system 812 includes controller 825 in lieu of controller 725. For ease of illustration, the remaining components of backlash prevention system 812 which are substantially identical to corresponding elements of backlash prevention system 712 are numbered similarly. Controller 825 is similar to controller. 725 of system 712 except that controller 825, in the braking state, utilizes stored electrical energy from energy storage device 521 to actuate and power brake mechanism 737 to brake the rotation of spool 516 and to sequentially conduct electrical current through coils 519 so that coils 519 act as a motor by applying a magnetic torque to magnet 517 (shown in FIG. 11) to brake the rotational velocity of spool 516 and to prevent backlash. In particular, controller 825 preferably comprising a conventionally known microprocessor, such as an Intel 80C196, supported within a bait cast fishing reel and configured or programmed to switch between an energy storing state and a braking state. Depressment of the clutch of the fishing reel actuates a switch which transmits a signal to controller 825 to actuate controller. 825. Controller 825 thereafter powers sensor 523 using energy from energy storage device 521. Sensor 523 senses the rotational velocity of spool 516 (shown in FIG. 11) to generate signals which are transmitted to controller 825. Using these signals, controller 825 determines the initial starting point of a cast and calculates a spool rotational rate of acceleration, rate of deceleration and the timing as well as magnitude of the maximum rotational velocity of spool 516 during the cast. Controller 825 uses this calculated information to determine when to switch from the energy storing state to the braking state.

In the energy storing state, controller 825 appropriately electrically couples leads 527 and 529 of coils 519 to a rectifier bridge and ultimately to battery 745 and capacitor 747 of energy storage device 521 such that the electrical alternating current induced in coils 519 by rotation of magnet 517 and spool 516 is stored by battery 745 and capacitor 747 of energy storage device 521. During the energy storing state, controller 825 maintains braking mechanism 737 out of engagement with brake race 735.

In the braking state, controller 825 changes the electrical connections between leads 527 and 529 and energy storage device 521 such that electrical current from battery 745 and capacitor 747 is sequentially conducted through coils 519 in a reverse direction such that instead of acting as a generator, motor-generator 739 now acts as a motor wherein coils 519 create a magnetic field which applies a torque to magnet 517 and spool 516 in the reverse direction so as to oppose the rotation of spool 516. At the same time, controller 825 also actuates braking mechanism 737 and utilizes stored electrical energy from battery 745 and capacitor 747 to power braking mechanism 737 to further brake or slow the rotation of spool 516. In particular, controller 825 utilizes energy from battery 745 and capacitor 747 to power actuator 740 which moves braking surface 743 of block 741 into frictional engagement with the surface of race 735. Controller 825 controllably varies the amount of braking force applied by coils 519, functioning as a motor, and braking mechanism 731 to appropriately slow the rotation of spool 516 to preferably match the rate at which line is released from spool 516 according to the general relationship shown in the graph of FIG. 6.

VIII. Conclusion

Each of the above-described backlash prevention systems 12, 212, 312, 412, 512, 712 and 812 generate consecutive signals representing rotational velocity of the spool, compare the consecutive signals to identify a peak time when the spool is rotating with the maximum velocity and apply a braking force to the spool after the peak time. Each of the backlash prevention systems apply an increasing braking force to the spool as the rotational velocity of the spool decreases. As a result, each of the backlash prevention systems automatically adapt to varying casting conditions. Moreover, each of the backlash prevention systems includes a braking mechanism which requires few, if any, moving parts, which is simple and easy to manufacture and which is controllable. Although the electroconductive members in each of backlash prevention systems 212, 312 and 412 have been illustrated as encircling magnet 60 and 260, magnet 260 may alternatively comprise a magnetic ring encircling the electroconductive members.

Although backlash prevention systems 212, 312 and 412 have each been illustrated as including a plurality of electroconductive members 268 comprising coils within the magnetic field of magnet 260, any of backlash prevention systems 212, 312 and 412 may alternatively include a single electroconductive coil eccentrically extending about magnet 260 or non-concentrically extending within a magnetic ring. Furthermore, although less desirable, the alternative utilization of magnetic electroconductive members in place of members 66–80 and 268 is also contemplated within the spirit of the scope of the invention.

Although backlash prevention systems 12, 212, 312, 512, 712 and 812 have each been illustrated as including a microprocessor having a timer and a memory storage device so as to provide a digital control system, backlash prevention systems 12, 212 and 312 may alternatively comprise wholly analog systems or hybrids of analog and digital control systems. For example, the microprocessors of systems 12, 212 and 312 may alternatively be replaced with conventionally known analog components such as capacitors and the like which automatically trigger the braking of spool 16 after spool 16 has reached a maximum rotational velocity. Systems 212 and 312 may alternatively include a capacitor in place of the microprocessor. As spool 16 rotates, the capacitor is charged such that voltage across the capacitor is low. As the capacitor continues to charge, the resistance slowly increases. Consequently, the voltage across the capacitor also increases. Once the voltage across the capacitor reaches a predefined level, this voltage triggers the transistor so as to trigger the braking of spool 16. Preferably, the capacitor and transistor are configured so as to trigger the braking of spool 16 after spool 16 has reached the maximum rotational velocity. It is also contemplated that such an alternative analog system would additionally include a potentiometer to adjust the sensitivity of the transistor. For example, if the cast of fishing line is expected to be strong such that rotational velocity of spool 16 is also expected to be large, the transistor may be adjusted so as to trigger the braking of spool 16 at a larger voltage. Conversely, if the cast is expected to be weak such that the rotational velocity of spool 16 is expected to be small, a potentiometer would be used to adjust the sensitivity of the transistor such that the braking of spool 16 is triggered at a smaller voltage across the capacitor.

Although the present invention has been described with reference to preferred embodiments, workers skilled in the art will recognize that changes may be made in form and detail without departing from the spirit and scope of the invention. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A fishing reel comprising:

a frame;

a spool rotatably coupled to the frame;

a spool rotation sensor comprising a magnet and configured in relation to said spool to generate spool rotation signals representing rotation of the spool over a time interval;

a controller coupled to the sensor and configured to compare spool rotation signals and to generate a control signal based on spool rotational velocity, acceleration rate, and/or deceleration rate; and a braking mechanism coupled to the controller wherein the braking mechanism applies a braking force to slow the spool in response to the control signal from the controller.

2. The fishing reel of claim 1, wherein the braking mechanism utilizes the electrical energy from an electrical energy storage device to slow the spool.

3. The fishing reel of claim 1, wherein the spool includes a first surface and wherein the frame includes a stationary second surface, wherein the braking mechanism brings the first and second surfaces into frictional engagement to slow the spool.

4. The fishing reel of claim 1, wherein the braking mechanism continuously applies a braking force to the spool and wherein the braking mechanism utilizes stored electrical energy to lessen the braking force applied to the spool based upon the control signal.

5. The fishing reel of claim 4, wherein the spool includes a first surface, wherein the frame includes a second surface, wherein the first and second surfaces are resiliently biased into frictional engagement with one another and wherein the braking mechanism utilizes stored electrical energy, to lessen the braking force by applying a force to one of the first of the second surfaces in a direction so as to lessen frictional resistance therebetween.

6. The fishing reel of claim 1 wherein said sensor comprises a magnet coupled to said spool and an electroconductive member coupled to said frame so that it passes through the magnetic field from said magnet as said spool rotates past said electroconductive member.

7. The fishing reel of claim 1 comprising a plurality of magnets.

8. The fishing reel of claim 1 wherein braking force is applied to minimize backlash.

9. The fishing reel of claim 8 wherein the application of braking force is based upon a detected rate of deceleration and timing of maximum rotational velocity.

10. The fishing reel of claim 8 wherein the application of braking force is based upon a detected reduction in spool rotation rate relative to a maximum rotational velocity.

11. The fishing reel of claim 1 wherein said controller is a microprocessor.

12. The fishing reel of claim 1 wherein said braking mechanism comprises an inner surface of said spool whereby radial inward movement of a brake block frictionally contacts said outer surface and slows said spool.

* * * * *